United States Patent
Chan et al.

(10) Patent No.: US 11,032,084 B2
(45) Date of Patent: Jun. 8, 2021

(54) GENERIC CODE SIGNING CLIENT WITH DOWNLOADABLE MODULES

(71) Applicant: ARRIS Enterprises LLC, Suwanee, GA (US)

(72) Inventors: Tat Keung Chan, San Diego, CA (US); Ting Yao, San Diego, CA (US); Jason A. Pasion, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 168 days.

(21) Appl. No.: 16/213,109

(22) Filed: Dec. 7, 2018

(65) Prior Publication Data

US 2020/0186359 A1    Jun. 11, 2020

(51) Int. Cl.
*H04L 9/32*    (2006.01)

(52) U.S. Cl.
CPC .......... *H04L 9/3247* (2013.01); *H04L 9/3213* (2013.01); *H04L 9/3268* (2013.01)

(58) Field of Classification Search
CPC .... H04L 9/3247; H04L 9/3268; H04L 9/3213
See application file for complete search history.

(56) References Cited

U.S. PATENT DOCUMENTS

| | | | |
|---|---|---|---|
| 2016/0365983 A1* | 12/2016 | Shahabuddin | G06F 21/645 |
| 2017/0085532 A1* | 3/2017 | Chan | H04L 63/0281 |

OTHER PUBLICATIONS

U.S. Appl. No. 16/246,870, filed Jan. 14, 2019.

* cited by examiner

*Primary Examiner* — Khoi V Le
(74) *Attorney, Agent, or Firm* — Chernoff, Vilhauer, McClung & Stenzel, LLP

(57) ABSTRACT

A method for signing data such as software images is provided that uses modules executable by a generic client to sign hashes of the software images rather than the images themselves. The method avoids both the requirement for new or updated client software and the uploading of full software images to the signing system. This approach uses a generic client that requests and downloads processing modules from the signing system to perform the pre-processing operations in signing software images, as well as optionally for post-processing operations.

20 Claims, 17 Drawing Sheets

GENERIC CODE SIGNING CLIENT WITH DOWNLOADABLE MODULES

BACKGROUND

1. Field of the Invention

The present invention relates to systems and methods for signing data for use on devices, and in particular to a system and method for providing generic entity and user access management of code signing services.

2. Description of the Related Art

It is beneficial in some circumstances to provide data to devices which have already been distributed to end users (e.g. fielded devices). Such data may be needed to update the device(s) to newer configurations or to perform additional functions, to ameliorate software "bugs" or other issues, or to simply replace data already resident in the device that may have been compromised. Such data may include software instructions (e.g. code) update fielded devices by providing data such as software code to those devices remotely.

One of the problems with the remote downloading of such data to fielded devices is that the data may be from an unauthorized source. An entity providing the data to the fielded devices may pose as a legitimate source of the data, yet provide data that is designed to compromise the security or functionality of the device. For example, the user of the device may be misled into believing that their device needs a software update in order to function properly, and may be provided a bogus uniform resource location (URL) from which to download the software update. If the user downloads and installs the software update from the bogus URL, the code that is actually downloaded may include a virus or other malware that negatively affects the operation of the device, perhaps compromising all of the data (including the user's private information) that was stored by the device before the infected.

To prevent the foregoing problems, code signing techniques can be used to digitally sign data such as executables and scripts. Such signatures confirm the identity of the author of the data and guarantee that the data has not been altered or otherwise corrupted since it was signed. Most code signing paradigms provide a digital signature mechanism to verify the identity of the author of the data or build system, and a checksum to verify that the data object has not been modified. Such code signing paradigms typically use authentication mechanisms such as public key infrastructure (PKI) technologies, which rely on data publishers securing their private keys against unauthorized access. The public key used to authenticate the data signature should be traceable back to a trusted root certificate authority (CA). If the data signature is traced to a CA that the device user trusts, the user is presumed to be able to trust the legitimacy and authorship of the data that is signed with a key generated by that CA.

Systems for code signing are known in the art. Such systems provide a framework that allows different organizations or companies to structure their data signing permission needs as they see fit or to safely permit data signing by other independent organizations.

Typically there are some processing steps to be performed before and after the signature is generated by the server. These processing steps may be implemented on the server side, in which case the full software image has to be uploaded to the server for processing. When the software image size is large, this process is time consuming and the transmission may be interrupted if the communication link is unreliable. What is needed is a system and method for signing software images and other information without requiring the full software image to be uploaded to the server.

SUMMARY

To address the requirements described above, the present invention discloses a method and apparatus for signing data such as a software image. In one embodiment, the method comprises (a) accepting a request to sign a software image, the request comprising the software image and a pointer to a signing configuration already defined in a signing system, the signing configuration including a signing operation type, (b) transmitting a module request to the signing system, the module request for a module for performing operations associated with signing the software image, the request comprising a pointer to the signing configuration, (c) receiving the module and at least a subset of configuration parameters for executing the module from the signing system, the module identified by the signing system according to the pointer transmitted with the module request, (d) executing at least a subset of the operations of the module on the software image according to the at least a subset of the configuration parameters to generate a modified software image, (e) generating a hash of the modified software image, (f) transmitting a signing request to the signing system, the signing request comprising the hash of the modified software image and a pointer to the configuration, and (g) receiving a signature generated from the modified software image. The method may further comprise (h) executing further module operations to generate the signed software image according to the modified software image and the signature generated from the modified software image.

Another embodiment is evidenced by an apparatus comprising a processor communicatively coupled to a memory storing processor instructions for performing the foregoing operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Disclosed below is an online code signing system (OCSS) that supports standard code signing formats such as PKCS #1, PKCS #7 and other proprietary signing mechanisms. The OCSS also performs operations such as code encryption and decryption.

The OCSS offers a web portal for users to login and sign code images or other types of digital objects, generate digital signatures, encrypt code, and/or decrypt code manually and a web service interface for machine clients to do so programmatically. In order to provide such an automatic mechanism to sign code, a machine-to-machine interface is provided over Internet such that the Client/User machine can automatically connect with the OCSS to request code signing. The OCSS utilizes an architecture which consists of a client application, an OCSS frontend (front-end server), and an OCSS backend (back-end server).

Figure 1:
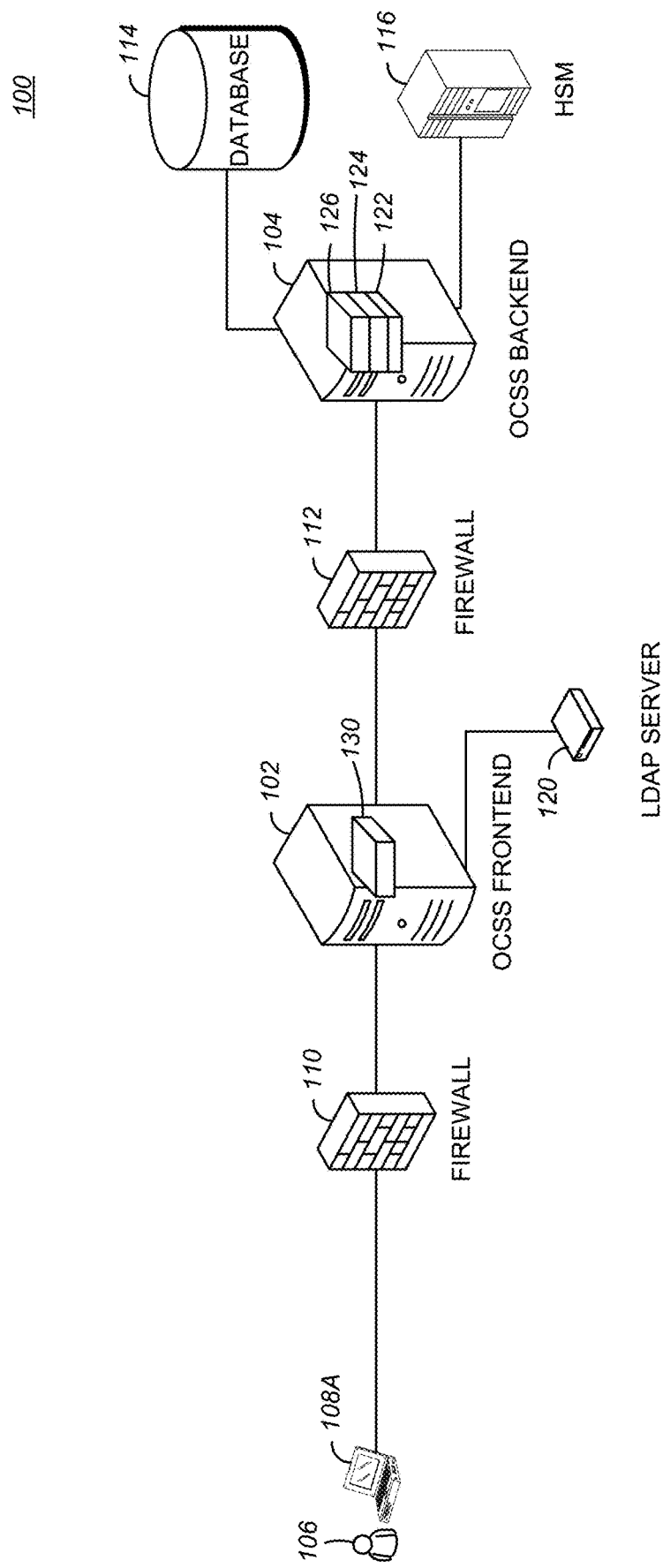
FIG. 1 is a diagram depicting one embodiment of an OCSS.

FIG. 1 is a diagram depicting one embodiment of an OCSS 100. The OCSS frontend 102 is a Graphic User Interface (GUI) layer that is the presentation layer for the OCSS 100. In one embodiment, the frontend 102 is hosted on a server that is behind a firewall 110 to protect against unnecessary or unauthorized access. The OCSS frontend 102 comprises a web portal interface 130 that implements the presentation (e.g. "look and feel") of functionality of the OCSS 100 on the user device 108A to an external user 106. In one embodiment, the web interface 130 is hosted in an Internet Information Service (IIS). Preferably, the OCSS frontend 102 does not enforce signing permissions, perform any signing or key generation activities, or define the hierarchy of the entities discussed below or how the access to such entities are managed. Rather, the OCSS frontend 102 controls access to the OCSS backend 104, and the OCSS backend 104 performs the functionality of enforcing signing permissions, performing signing or key generation activities, and/or defining the hierarchy of the entities discussed below and how the access to such entities are managed.

The OCSS frontend 102 also has access to a server operating according to the Lightweight Directory Access Protocol (LDAP) (hereinafter LDAP server 120) to authenticate valid user device 108A. The OCSS 100 maintains its own database of user 106 accounts, and the LDAP server 120 is used when a user is added to the system for the first time and a user account is created and stored in the OCSS database 114.

To access the OCSS 100, the user 106 must to specify user credentials, such as an LDAP password. Those credentials are used to validate every user session between the user and the OCSS frontend 102. The OCSS 100 forbids access to users 106 unless valid credentials are provided by the user device 108A and favorably compared to analogous information specified in database 114. Hence, only valid OCSS 100 users having credentials matching those stored in the database 114) are allowed to access OCSS 100.

The OCSS backend 104 is behind a second firewall 112 and provides protected access to the database 114 and the code signing keys that are stored in a hardware security module (HSM) 116. It is used to access the OCSS hierarchical entities discussed below and to look up user permissions for different code signing configurations and to perform all authorized crypto operations. The OCSS backend 104 connects to HSM 114 and using the HSM 114, performs operations such as code signing, encryption, and decryption. The OCSS backend 104 implements a plurality of software layers including, from the top software layer to the bottom software layer, an OCSS Windows Service layer 126, a Business Logic Layer (BLL) 122 and a Data Access Layer (DAL) 124.

The OCSS Window Service layer 126 is the heart of OCSS 100 and is comprised of a plurality of signing/generation operations that are supported by OCSS 100. Depending on what type of service is needed, a specific dynamically loadable library (dll) required for that service may be injected into memory to perform the operation.

The Business Logic Layer (BLL) 122 specifies which users 106 have access to the OCSS 100 and the conditions on which access is granted or revoked. The BLL 122 also takes care of other business logic such as updating audit logs and generating reports.

The Data Access Layer (DAL) layer 124 provides access to the database 114 and enables queries to access, add or remove entries in the database 114.

Manual Interactive Web Processes

Figure 2:
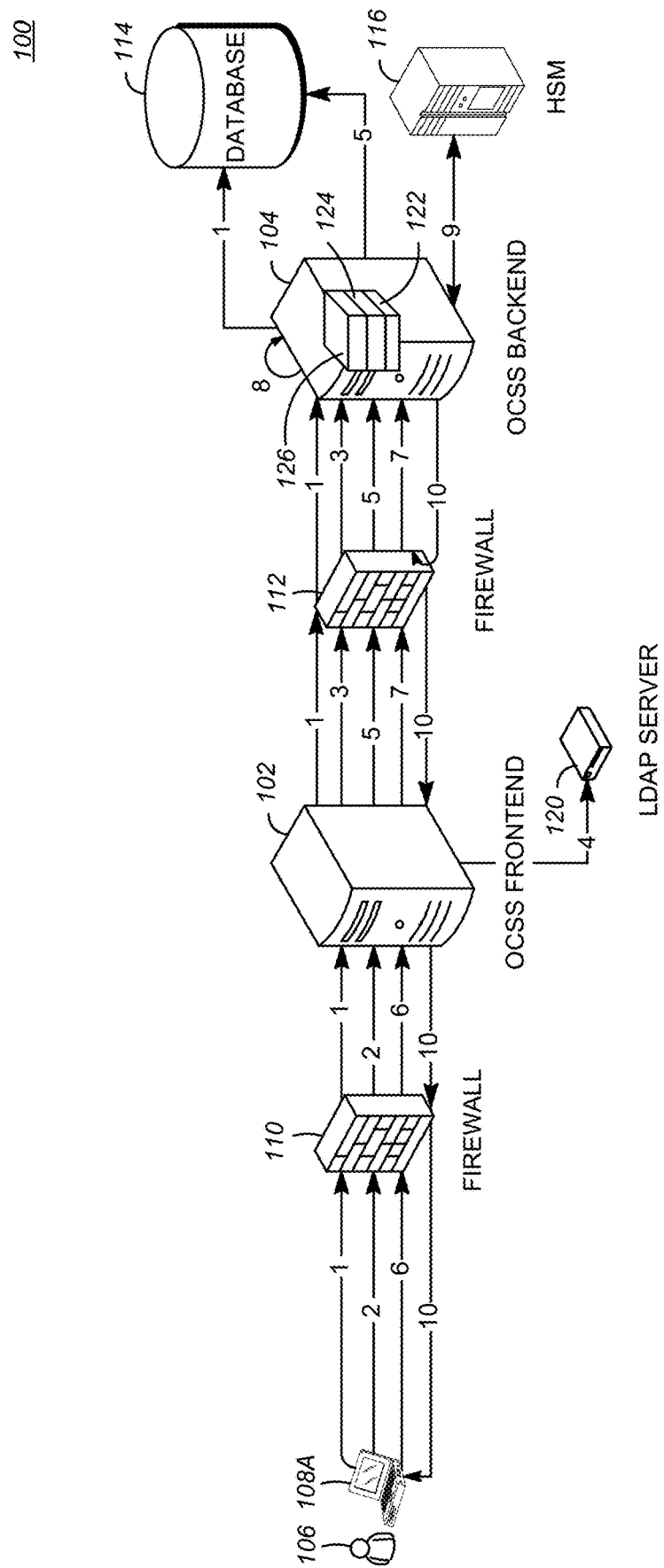
FIG. 2 is a diagram illustrating one embodiment of a manual process by which the designated users of the OCSS is used to sign data.

In a first embodiment, a manual code signing generation functionality is provided users 106. FIG. 2 is a diagram illustrating one embodiment of a manual process by which the designated human users of the OCSS 100 use to sign data.

Step 1: Before a user 106 can access the OCSS 100, an administrator of the OCSS 100 adds user's LDAP username to the OCSS configurations(further described below) in database 114 corresponding to software development projects the user 106 has been assigned.

Step 2: The user 106 interacts with the OCSS frontend 102 via a web browser executing on a user device 108A. Preferably, this interaction is performed using the secure hypertext transfer protocol (HTTPS).

Step 3: The OCSS frontend 102 utilizes appropriate services provided by the OCSS backend 104 over a simple object access protocol (SOAP) interface.

Step 4: When the user 106 logs in, the OCSS frontend 102 validates the user credentials (e.g. username and password) received from the user device 108A against data stored in the LDAP server 120 and if the user credentials compare favorably with the data stored in the LDAP server 120, the user 106 is allowed to access the OCSS 100. If not, the user 106 is denied access to the OCSS 100.

Step 5: Based on logged in user's credential, the OCSS frontend 102 invokes BLL 122 of the OCSS backend 104 to look up user permissions to determine which configurations the logged in user has access to and presents only those configurations to the user 106.

Step 6: Using the user device 108A, the user 106 then selects one or more of the presented configurations and uploads an input/request file as well as other request parameters to OCSS frontend 102.

Step 7: The OCSS frontend 102 passes the uploaded input/request file, selected configuration, and operational details such as which signing key, signature algorithm, and/or digital signature format to use to OCSS backend 104.

Step 8: The OCSS backend 104, upon receiving request from the OCSS frontend 102, invokes the OCSS Window Service layer 126.

Step 9: The invoked OCSS Window Service layer 126 accesses the HSM 116 to get the keys that are needed to sign the data in the input/request file, and also retrieves configuration details from database 114. In one embodiment, the OCSS Window Service layer 126 also parses the input file. This is required because for some signing operations, the input file has to follow a particular format, and this operation verifies that the input file is using the proper format, then retrieves certain information from certain portion(s) of input file. The OCSS Windows Service layer 126 then performs appropriate operations such as code signing, encryption and decryption on the relevant portions of the input file. Based on these operations, the OCSS Window Service layer 126 generates an output response file having the signed data and other information.

Step 10: The OCSS Window Service layer 126 returns the generated output/response to the OCSS frontend 102. The OCSS frontend 102 generates a file from the generated output/response, which is forwarded to the user computer 108.

Automated Machine-to-Machine Interface

Another embodiment provides the automatic signing generation functionality to customers such that they can integrate this in their automated build process. In order to provide such a mechanism a machine-to-machine interface must be provided over Internet such that machine user 108B can automatically connect with our OCSS 100 Service to request code signing. The OCSS system 100 has two types of users: human users 106 and machine users 108B. Both may have "user" role in the system, while only human user can have "manager" or administrator role. The machine to machine interface is for a machine user 108B to request code signing programmatically.

Figure 3:
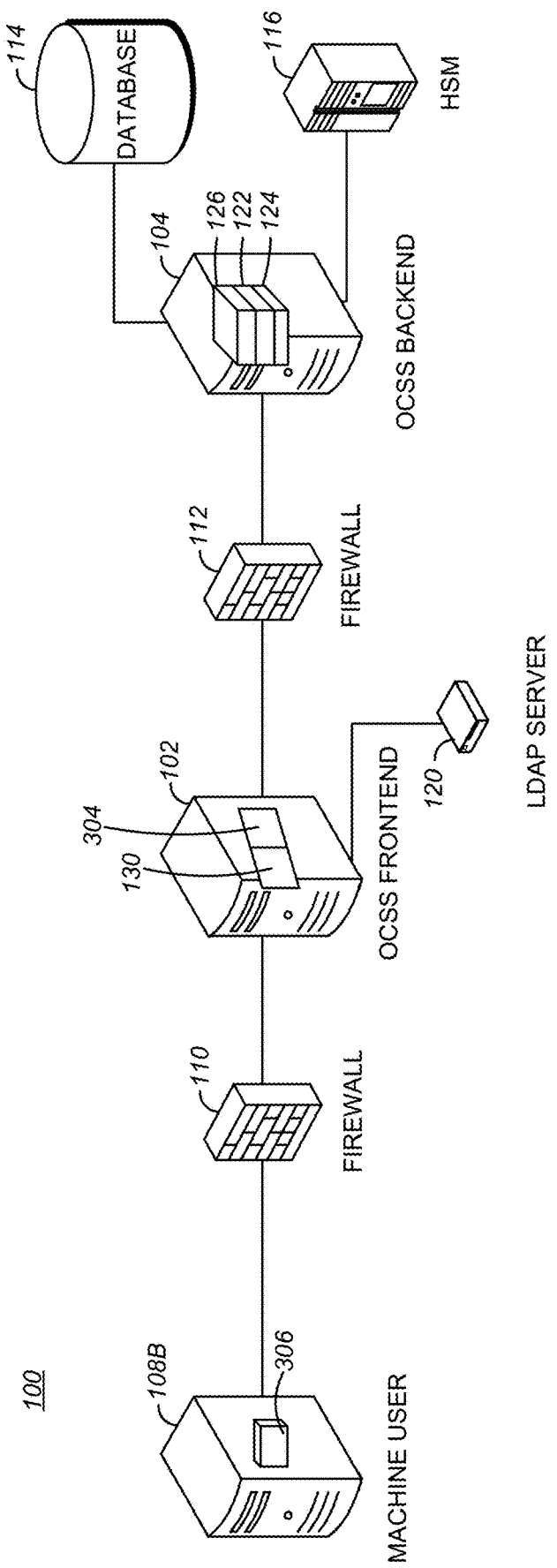
FIG. 3 is a diagram of an automated version of the OCSS.

FIG. 3 is a diagram of an automated version of the OCSS 100. As described below, the automated OCSS 300 uses same OCSS architecture depicted in FIG. 1, and can be used to support automated online requests from a client/machine 108B associated with an IP address. In this case, the IP address is treated as a virtual user of the OCSS 100 and can obtain the same kinds of permissions as are normally assigned to a human user 106.

The automated OCSS 100 introduces two new components: an OCSS client tool 306 implemented on an OCSS client 108B and an OCSS web service 304. The OCSS client tool 306 may be implemented in JAVA. The OCSS Web Service 304 provides an interface to the OCSS 100 infrastructure elements described above.

The automated OCSS 100 implements a machine-to-machine interface that comprises OCSS client tool 306, OCSS Web Service 304 and OCSS backend 104. OCSS backend 104 functionality is shared between the manual user access modes described with respect to FIG. 2 (e.g. graphical user interface or GUI), and the machine-to-machine interface described further below.

OCSS Client

The machine user 108B utilizes an OCSS client 306 that comprises an executable written in a general purpose programming language that can be executed in virtually any environment, such as JAVA.

The OCSS client 306 that is executed in the machine user 108B environment handles any pre and post processing of image files of the data to be signed so the machine user 108B does not need to know the details of the signing operations being performed on such data. The OCSS client 306 communicates with the OCSS Web Service 304 which runs on OCSS frontend 102.

OCSS Web Service

The OCSS web service 304 is hosted on OCSS frontend 102 behind firewall 110 to protect against unauthorized access. The OCSS web service 304 can be hosted in IIS and performs authorization and authentication functionality of OCSS 100 and does not include system and other crypto operation details. The OCSS web service 304 allows the OCSS client 302, through the OCSS frontend 102 to request code signing, encryption and decryption without a human interface or user 106 involvement.

OCSS Machine-to-Machine Process

Before an OCSS machine user 108B can access OCSS 110, the OCSS 100 administrator creates a user (machine) account in the LDAP server 120 and personalizes a hardware cryptographic token for that machine 108B. The hardware cryptographic token can be used for client machine 108B authentication in a number of ways.

Once the OCSS machine user 108B is authenticated, the OCSS Web Service 304 invokes OCSS backend 104 to retrieve machine authorization permission data that is used to determine whether the requesting machine account is authorized to perform the requested operation. Such authorization permission data is stored in the database 114.

Upon receiving the request from OCSS Web Service 304, the OCSS backend 104 invokes the OCSS Window Service 126, which accesses the HSM 116 to retrieve the keys required for the data signing process and also retrieve configuration details for the configurations that the client 302 is authorized to access or control. The OCSS backend 104 then optionally parses the input file provided by the machine user 108B above. The OCSS backend 104 then performs the appropriate action such as signing the code or other data in the input file, and/or encryption and decryption of data or keys. Based on the results of the action, the OCSS Window Service 126 generates a response having the output or results of the requested action. This output may comprise, for example, the signed data, and/or encrypted or decrypted keys. The OCSS Window Service 126 later returns this output to OCSS Web Service 304 executing on the OCSS frontend 102. The OCSS Web Service 304 returns the generated output to OCSS client 306. If no output is available, the OCSS web service 304 returns an error code.

The OCSS 100 is secured with multiple layers of protection against unauthorized access and protection of private keys including those used to sign the data. Such protection includes:

User access is controlled by providing a hardware crypto token to the machine user 108B. The hardware crypto token contains a certificate and is associated with a username and password. A physical token tying the machine to an account (more secure than traditional username/password) may also be used.

User authorization is role-based and very flexible, allowing different roles including administrator, manager, or user. Machine user 108B can only be assigned "user" role.

The OCSS backend 104 is deployed in a secure area behind firewall 112 which allows access to the OCSS backend 104 only from the OCSS frontend 102 and in one embodiment, only on two web services ports, with access to a structured query language (SQL) server and the HSM 116 locked down.

Private keys are stored in HSM 116, and those keys cannot be retrieved in clear form. A PKCS11 interface is used for code signing, encryption and decryption operations, thus never exposing the private keys in clear form.

Critical operations are checked against authorization rules (stored in the database 114) and performed only if they are compliant with those rules.

Certificates are generated with the IP address of the machine user 108B as a unique user identifier in the CommonName attribute of each certificate. A client is not permitted to be behind proxy settings, so that the machine user 108B IP address is the actual address and not modified as seen by the server. IP addresses may be blocked from accessing OCSS 100 configurations and entities based on the geographic location associated with that IP address.

Management of Users

As described above, there is a need to provide a framework that allows different organizations or companies to structure their data signing permission needs as they see fit or to safely permit data signing by other independent organizations that publish the data to their customers. This is accomplished by defining a hierarchical organization of a plurality of entities within the OCSS, and managing eligibility to designate users to access those entities via accounts granting different eligibility status, as further described below.

An account represents the relation between a company and an OCSS entity and all of the children of the OCSS entity. An account is one of two account types, including an owner account type, and a participant account type. Granting an account provides eligibility to grant permission of a user to access an OCSS entity (and those hierarchically below that entity), but not permission itself. The permission is instead granted to the eligible user. A company may have multiple accounts for different OCSS entities, as further discussed below.

The top level OCSS entity (the application platform entity discussed below) can be owned by just one company through an owner account. This is enforced by the OCSS administrator granting an owner account to only one company. However, a company may have a participant account on the two top OCSS entity levels (the application platform entity and the project entity). This structure allows different OCSS entities to be accessible by multiple companies by the granting of the particular type of account (owner or participant).

Only users from an owner account can be assigned as a manager, and only users whose company has an account (either an owner account or a participant account) can be granted permission to sign data to be installed on devices associated with an entity associated with that account.

Figure 4:
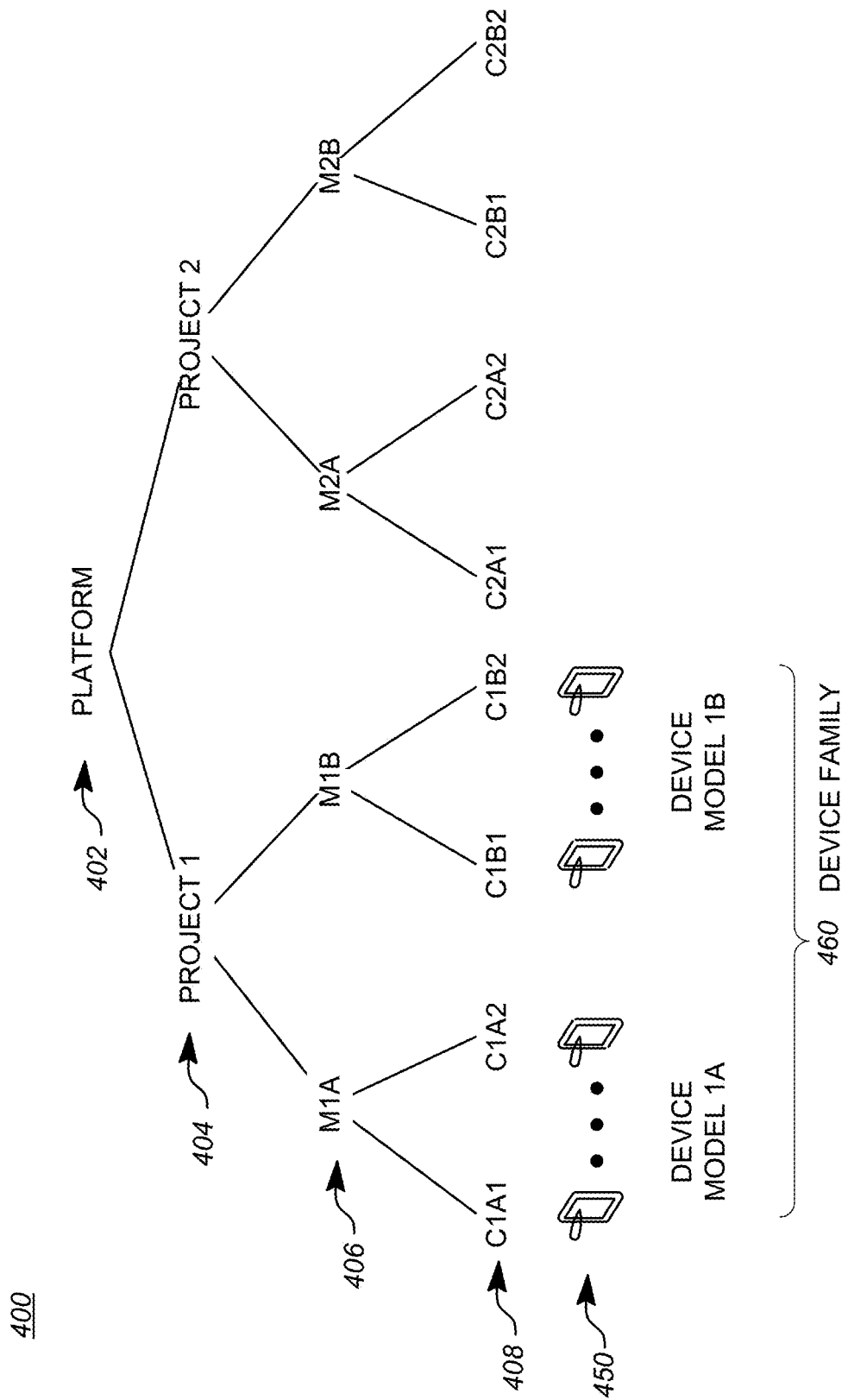
FIG. 4 is a diagram depicting a hierarchical organization (e.g. hierarchy) of a plurality of entities associated with data signing operations.

FIG. 4 is a diagram depicting a hierarchical organization (e.g. hierarchy 400) of a plurality of entities associated with data signing operations discussed above. The hierarchy 400 of entities includes, in decreasing hierarchical order, an application platform entity 402, at least one project entity 404 for each application platform entity 402, at least one model entity 406 for each project entity 404 and at least one configuration entity 408 for each model entity.

The application platform entity 402 may be evidenced by a corporate entity that produces a plurality of devices 450, for example, the assignee of this application, ARRIS, INC. A platform entity is defined as a highest hierarchical entity that organizes the code signing metadata/information for the fielded devices 450.

The project entity 404 typically comprises a family of devices 460 produced by the application platform entity 402. For example, the corporate entity ARRIS may produce a first family of devices 406 such as set top boxes (STBs) for receiving satellite broadcasts (one project entity) and another family of devices 460 such as STBs for receiving cable broadcasts. Familial or group bounds can be defined as desired, but are typically defined to include products with analogous or similar functional requirements or functional architectures. For example, the project entity may be defined according to the functionality or source of the chip used in the devices 450—for example, those that use one particular digital telecommunication processing chip family belonging to one project and another digital telecommunication processing chip family in another project entity.

The model entity 406 can represent the particular models of the devices 450, for example models of satellite STBs and cable STBs. In the context of data signing, the model designation defines the how the signed data is to be installed on the devices 450 associated with the model entity 406. For example, a particular model of satellite STB may use a different technique for installing new data or code than a different model of the satellite STB. In the context of signing, the configuration entity defines the data to be installed on the devices 450.

For example, the satellite STB of the aforementioned example may include bootloader code (code that executes upon a system reboot that uploads and executes code and scripts), as well as application code. The one configuration entity may represent bootloader code, while a different configuration entity represents the application code.

Figure 5:
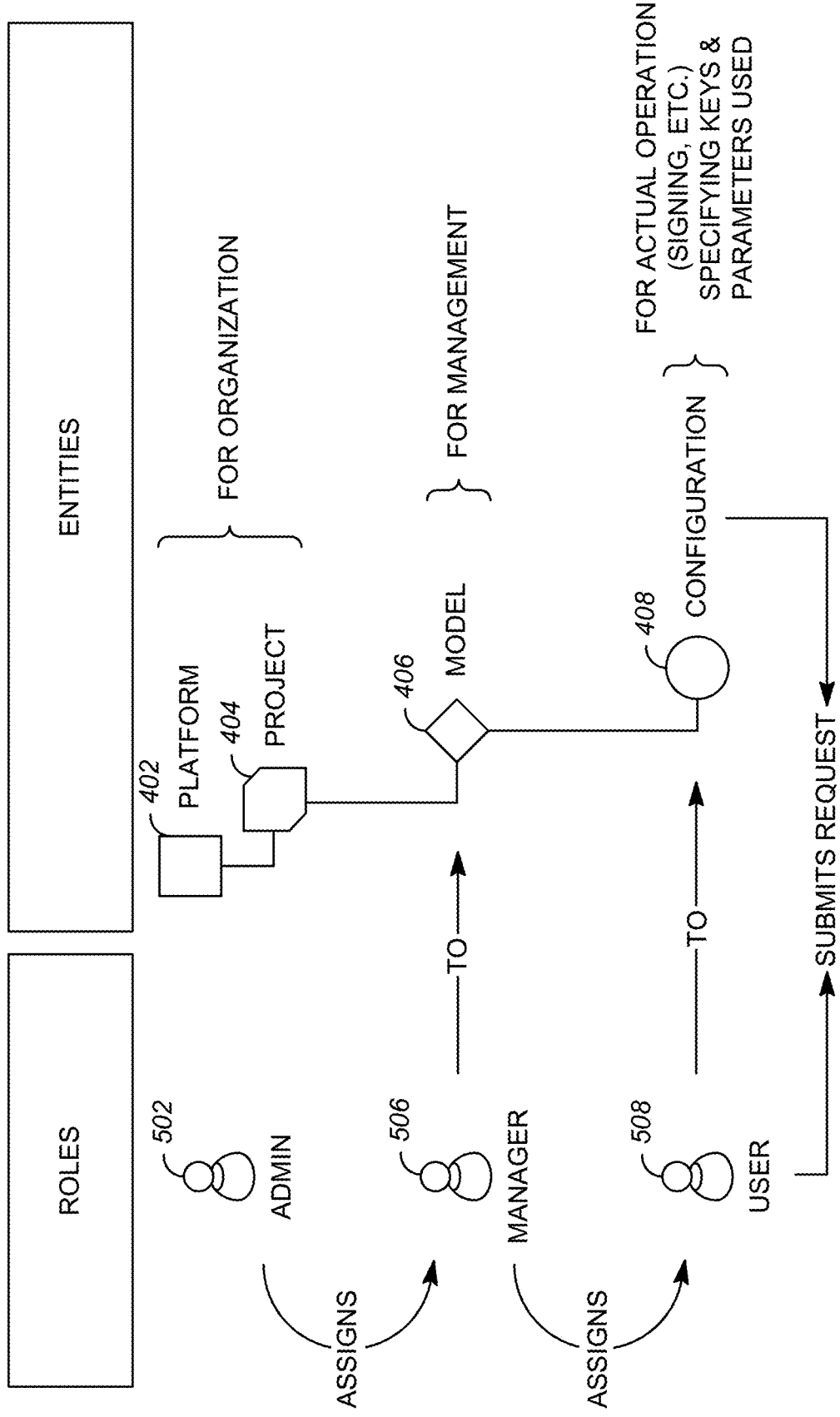
FIG. 5 is a diagram depicting the hierarchical organization and the user roles associated with those entities.

FIG. 5 is a diagram depicting the hierarchical organization 400 and the roles associated with those entities. An administrator 502 of the OCSS 100 is identified, and that administrator 502 is authorized to define the hierarchy of the entities in decreasing order, an application platform entity, at least one project entity for each application platform entity, at least one model entity for each project entity, and at least one configuration entity for each model entity. The administrator 502 is also authorized to access and authorize access to any of the entities 402-408 and may also assign a manager role 406 to another individual to manage a particular model entity 506. This individual (hereinafter alternatively referred to as the manager 506 of the model entity 406) is thus a person having the manager role 506 with respect to the associated model entity 406. This manager 506 is authorized to designate or assign user roles 508 to particular individuals for a particular configuration entity 408. This individual (herein alternatively referred to as a user 508 of a particular configuration entity 408) is thus a person having a user role 508 with respect to an associated configuration entity 408. Importantly, managers 506 may not add users (this can be accomplished only by the OCSS administrator), but authorize users to perform certain roles.

The configuration entity 408 holds information regarding the specific code signing operation such as signing keys, signature algorithm, file format, and other security parameters. Managers 506 are normally defined to have access to this configuration information for all the configurations under the manager's managed entity (model 406). Users who has access to a configuration entity 408 can use it to perform the code signing activity according to the specified information/parameter but normally don't see the detailed information (e.g. keys, algorithms and the like) itself.

Figure 6:
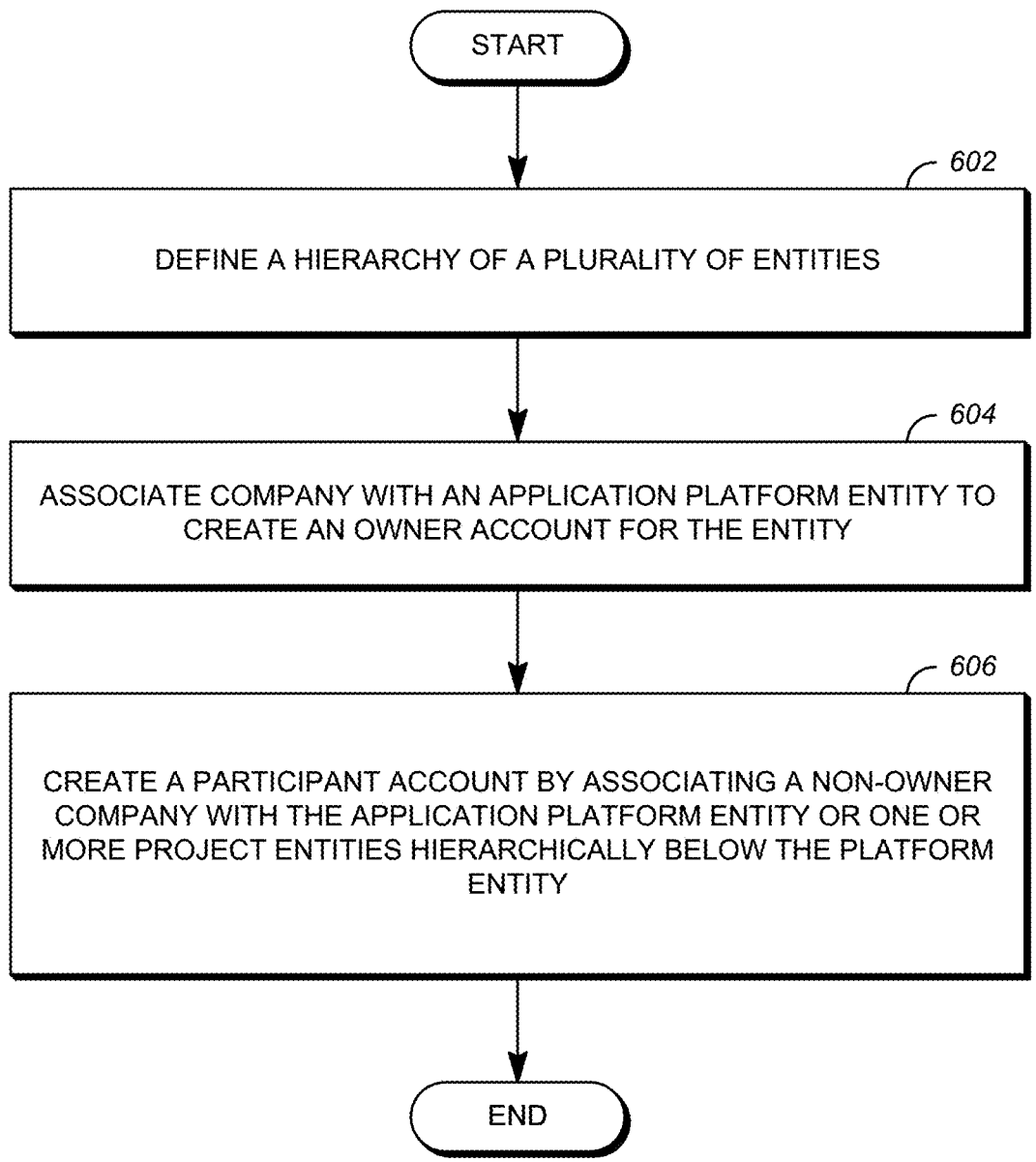
FIG. 6 is a diagram illustrating exemplary operations that can be used to manage the signing of data.

FIG. 6 is a diagram illustrating exemplary operations that can be used to manage the eligibility of signing of data. In block 602, a hierarchy 400 of a plurality of entities are defined, the hierarchy comprising, in decreasing hierarchical order, an application platform entity 402, having a sole owner, at least one project entity 404 for each application platform entity 402, the project entity 404 comprising a device family 460, at least one model entity 406 for each project entity 404, the model entity 406 defining the installation of the data on devices 450 associated with the model entity 406, and at least one configuration entity 408 for each model entity 406, the configuration entity 406 defining the data to be installed on devices 450 associated with the configuration entity 406. Next, eligibility to designate at least one of the plurality of users to access the at least one configuration entity 408 is managed via a plurality of accounts. As described above, the plurality of accounts comprises an owner account of the application platform entity 402, the owner account issued to only the sole owner of the application platform entity 402. The owner account provides sole eligibility to authorize access the application platform entity 402. The owner account also provides eligibility (but not sole eligibility) to permit authorization of access to any of the plurality of entities hierarchically below the application platform entity (including the project entity 404, model entity 406, and configuration entity 408 or entities hierarchically below the application platform entity 402. The plurality of accounts may also comprise at least one participant account of the application platform entity and/or the at least one project entity. The participant account provides eligibility to authorize users from a company which has a participant account to access the at least one configuration entity hierarchically below the application platform entity or the at least one project entity, respectively, to sign the data to be installed on the devices 450 associated with the at least one configuration entity. Thus, as illustrated in blocks 604 and 606 of FIG. 6, such eligibility to designate users to access the configuration entities 408 is performed by associating one company with an application platform entity 402 to create an owner account for that entity, then creating a participant account by associating another (non-owner) company with the application platform entity 402 or one or more project entities 404 hierarchically below the platform entity.

In one embodiment, the owner account provides sole eligibility to designate at least one manager 506 of the at least one model entity 406 hierarchically below the application platform entity 402 to authorize access to all configuration entities 408 hierarchically below the at least one model entity 406 to sign the data to be installed on the devices associated with the configuration entities below the at least one model entity 506. Further, the at least one manager 506 can authorize access to all of the configuration entities 408 hierarchically below the at least one model entity 406 to only users that are associated with the owner account of the application platform entity 402 hierarchically above the model entity 506 or the participant account of the application platform entity 402 hierarchically above the model entity 506.

Use Cases

FIGS. 7-10 are diagrams illustrating selective use application cases of the OCSS 100.

Figure 7:
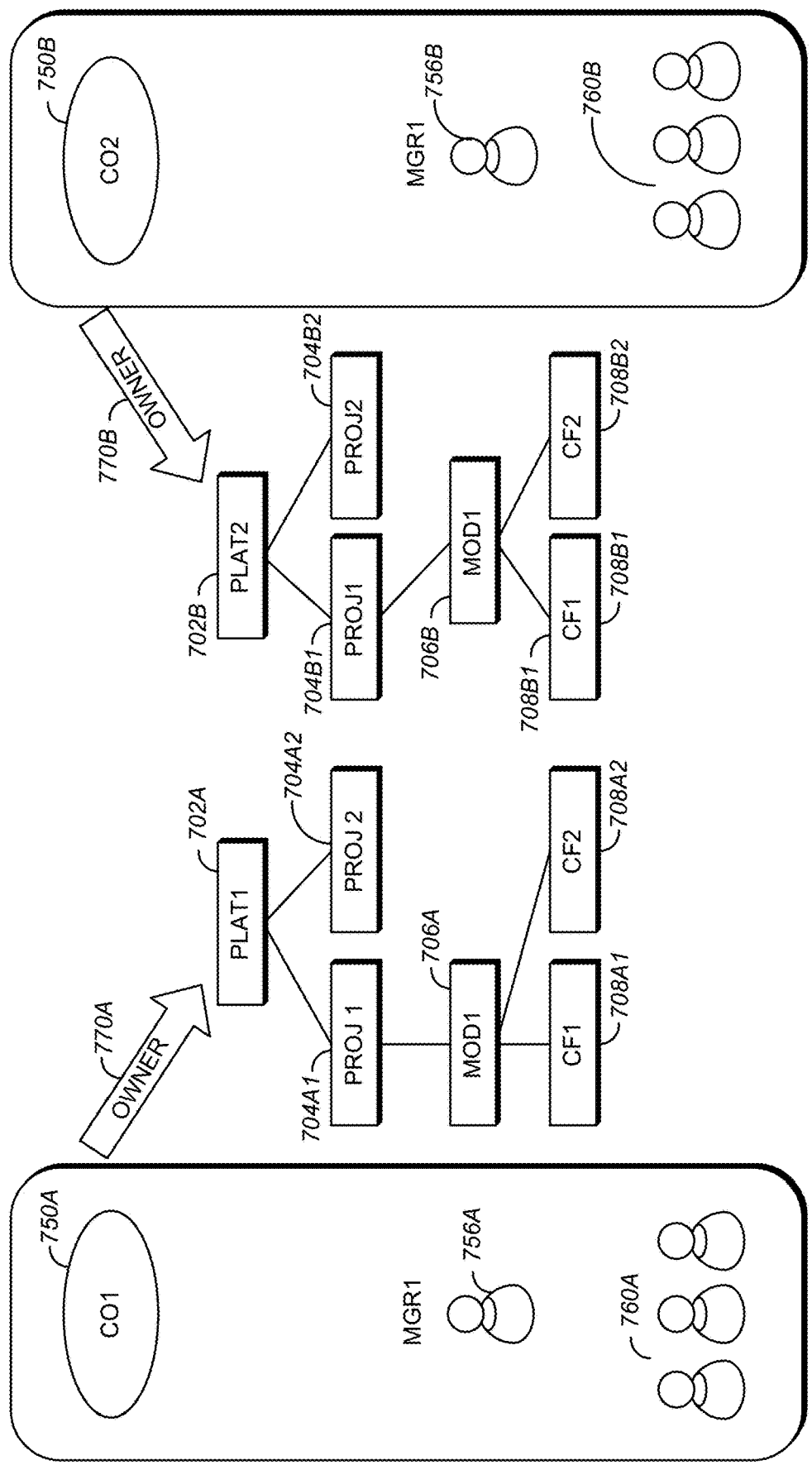
FIG. 7-10 are diagrams illustrating selective use application cases of the OCSS.

FIG. 7 is a diagram illustrating a first use application case of the OCSS 100. In this embodiment, a first company 750A would like only its users to be able to sign data to be installed on its own devices, and a second company 750B would like to do the same with respect to its own devices.

The OCSS administrator defines a hierarchy of a plurality of entities for each company 750A and 750B as follows. For the first company 750A, application platform entity 702A is defined with the first company 750A as the sole owner. Project entity 704A1 associated with the family of devices is created hierarchically below platform entity 702A. Other project entities 704A2 may also be defined. Model entity 706A hierarchically below project entity 704A1 is defined, and configuration entity 708A1 is also defined to be hierarchically below model entity 706A. Other configuration entities 708A2 may also be created.

For the second company 750B, application platform entity 702B is defined with the second company 750B as the sole owner. Project entity 704B1 associated with the family of devices is created hierarchically below platform entity 702B. Other project entities 704B2 may also be defined. Model entity 706B hierarchically below project entity 704B1 is defined, and configuration entity 708B1 is also defined to be hierarchically below model entity 706B. Other configuration entities 708B2 may also be created.

The OCSS administrator manages the eligibility to designate users to sign data to be installed on the devices by use of a plurality of accounts as follows. The OCSS administrator creates an owner account 770A associated with the application platform entity 702A for the first company 750A (sole owners of the application platform entity 702A). The OCSS administrator also creates an owner account 770B associated with application platform entity 702B for the second company 750B (sole owners of the application platform entity 702B). The OCSS administrator grants the created owner account 770A to the first company 750A and owner account 770B to the second company 750B. Since each company 750 has elected to manage the signing of data for their own devices and not enable other companies to manage of signing of data for their devices, no participant accounts have been created or granted to either the first company 750A or the second company 750B.

Next, a manager 756A of the model entity 706A hierarchically below a project entity 704A1 of the application platform entity 702A is assigned. That manager 756A authorizes users 760A associated with the model entity 706A being managed by the manager 756A to sign the data being installed on the devices associated with the configuration entities 708A1 and 708A2 hierarchically below the model entity 706A. Managers can assign users to the entities they manage by entering data unique to the user into the OCSS 100, for example, the user's email address.

Similarly, a manager 756B of the model entity 706B hierarchically below the project entity 704B1 of the application platform entity 702B is assigned. That manager 756B authorizes users 760B associated with the model entity 706B being managed by the manager 756B to sign the data being installed on the devices associated with the configuration entities 708B1 and 708B2 hierarchically below the model entity 706B.

So configured, the OCSS 100 allows users 760A associated with the first company 750A to sign data for use by devices of the device family associated with the model entity 706A, but not users 760B associated with the second company 750B. Similarly, the OCSS 100 thus allows users 760B associated with the second company 750B to sign data for use by devices of the device family associated with the model entity 706B, but not users 760A associated with second company 750A.

Figure 8:
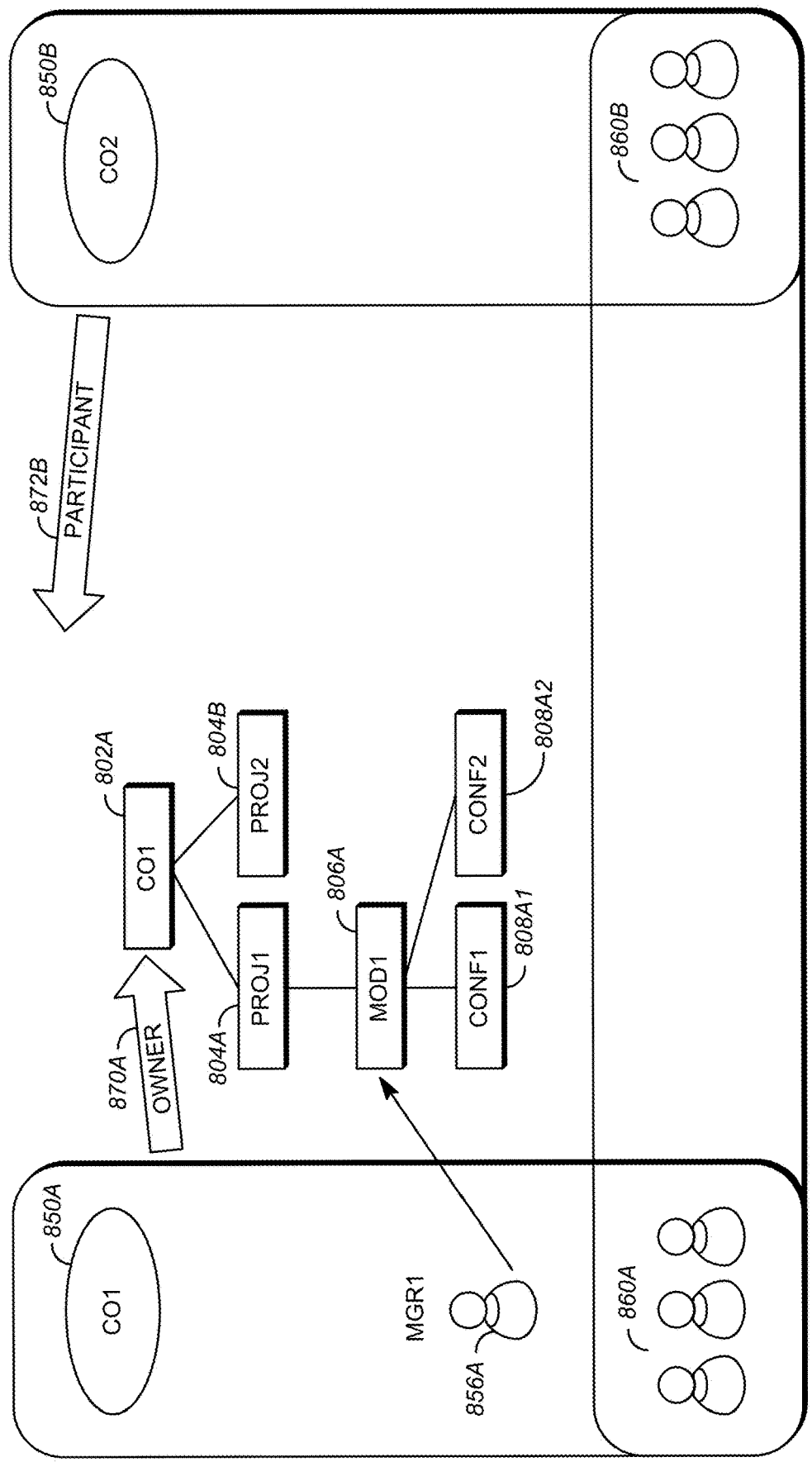

FIG. 8 is a diagram illustrating a second use application case of the OCSS 100. In this embodiment, first company 850A would like to allow its users to sign data to be installed on devices belonging to one of its device families, and would like to allow users from a second company 850B to sign data to be installed on the devices of the same device family.

The OCSS administrator defines a hierarchy of a plurality of entities for company 850A as follows. For the first company 850A, application platform entity 802A is defined with the first company 850A as the sole owner. Project entity 804A1 associated with the family of devices is created hierarchically below platform entity 802A. Other project entities 804A2 may also be defined. Model entity 806A hierarchically below project entity 804A1 is defined, and configuration entity 808A1 is also defined to be hierarchically below model entity 806A. Other configuration entities 808A2 may also be created.

Second company 850B would like to be entitled to allow its users 860B (e.g. employees or agents) to sign data that is to be installed on the devices of the family of devices associated with first project entity 804A. In this embodiment, first company 850A is a first business organization that is the sole owner of the application platform entity 802A, and second company 850B is a second business organization independent from the first business organization.

To accomplish this, the OCSS administrator creates an owner account 870A associated with the application platform entity 802A for the first company 850A (sole owners of the application platform entity 802A). A manager 856A of the model entity 806A hierarchically below the project entity 804A1 of the application platform entity 802A is assigned. This manager 856A authorizes users 860A of the first company 850A associated with the model entity 806A being managed by the manager 856A to sign the data to be installed on the devices associated with the configuration entities 808A1 and 808A2 hierarchically below the model entity 806A.

Since first company 850A has elected to manage the signing of data for their own devices and also to enable users associated with the second company 850B to sign data for the first company's devices, the OCSS administrator also creates a participant account 872B and grants the participant account 872B to the second company 850B.

The created participant account 872B may be associated with at least one of the application platform entity 802A or at least one of the project entities 804A and 804B. For example, the OCSS administrator can create a participant account 872A associated with the application platform entity 802A (which enables access to the application platform entity 802A and all entities hierarchically below the application platform entity 802A including the project entities 804A and 804B). This option makes it easier for OCSS administrators to manage future projects under the application platform, because eligibility to manage all project entities under the application platform entity is automatically provided in the participant account. Or, the OCSS administrator can create a participant account 872B associated with the project entity 804B of the device family of interest (which enables access to the project entity 804B and all entities hierarchically below the project entity 804B). This option provides tighter control, as eligibility for new projects under the application platform are not automatically granted by inheritance from the application platform entity, but instead must be granted to each project. This provides finer resolution control over eligibility, but requires the OCSS administrator to define a participant account for each project with a desired eligibility independent from the other projects.

In the illustrated embodiment, the participant account 872B that is created and granted is associated with the application platform entity 802A.

A manager 856A for the model entity 806A has already been assigned, so this assigned manager 856A authorizes users 860B associated with the participant account 872B to sign the data to be installed on the devices associated with the configuration entities 808A1 and 808A2 hierarchically below the manager's model entity 806A. Thus, the objective of the first company 850A allowing users 860B of the second company to sign data that is to be installed on the devices of the family of devices associated with first project entity 804A is achieved.

Figure 9:
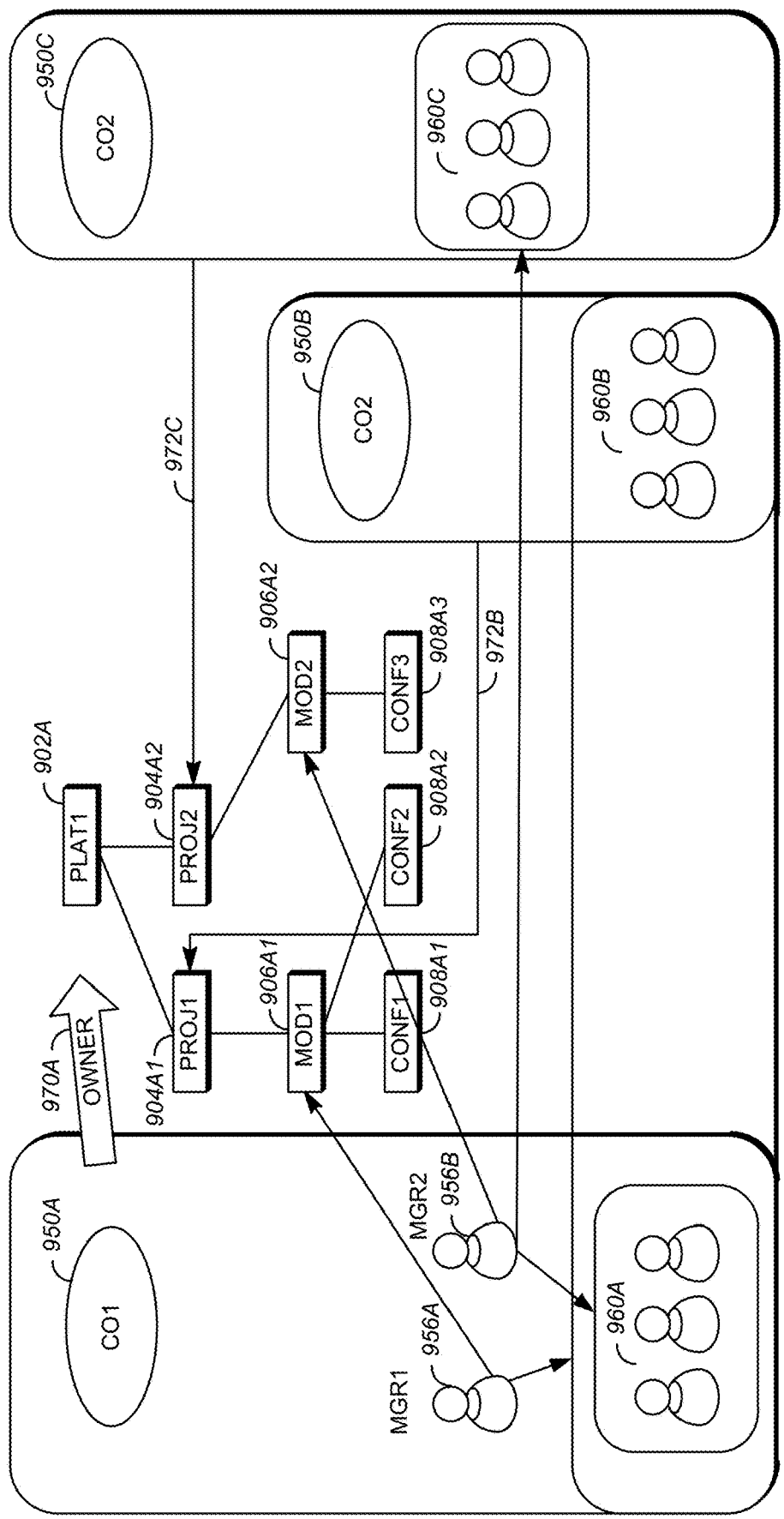

FIG. 9 is a diagram illustrating a third use application case of the OCSS 100. In this embodiment, a first company 950A is a sole owner of application platform entity 902A, and would like other companies to be able to sign data for use in it's devices. Further, first company 950A has two families of devices, and would like the users of a first company 950B to be able to sign data to be installed on only devices belonging to the first family of devices, and users of a second company 950C to be able to sign data to be installed only devices belonging to the second family of devices.

The OCSS administrator defines a hierarchy of a plurality of entities as follows. An application platform entity 902A is defined with the first company 950A as the sole owner. A first project entity 904A1 and a second project entity 904A2 are defined hierarchically below platform entity 902A, each representing a family of devices. The definition of two project entities 904A1 and 904A2 allows each to be separately managed so that only users of companies having a participant account associated with the project entities are eligible to be granted permission to sign data to be installed on devices of the device family associated with the project entity. This is further described below.

The OCSS administer further defines the hierarchy such that model entity 906A1 is hierarchically below project entity 904A1, and is the only such model entity hierarchically below project entity 904A1. Further, the hierarchy is defined such that model entity 906A1 includes configuration entities 908A1 and 908A2. Similarly, the OCSS administrator defines a second model entity 906A2 to be hierarchically below project entity 904A1. Further, model entity 906A2 includes only one configuration entity 908A3.

Hence, in the defined hierarchy, the platform entity 902A includes a first project entity 904A1, hierarchically above a first model entity 906A1, which is hierarchically above a first configuration entity 908A1 and second configuration entity 908A2. So that the eligibility to sign data to be installed on different families of devices can be separately managed, the hierarchy is also defined to include a second project entity 904A2 hierarchically below the platform entity 902A, which is hierarchically above a second model entity 906A2, which in turn is hierarchically above a third configuration entity 908A3.

First company 950A would like to allow users 960B from second company 950B to sign data used with devices associated with the first project entity 904A1 (e.g. devices in the device family associated with first project entity 904A1), and to allow users 960C from third company 950C to sign data used with devices associated with the second project entity 904A2 (e.g. devices in the device family associated with first project entity 904A1. In this embodiment, first company 950A is a first business organization that is the sole owner of the application platform entity 902A, and second company 950B and third company 950C are second and third business organization, respectively independent from the first business organization.

To implement the foregoing eligibilities and permissions, the OCSS administrator creates an owner account 970A associated with the application platform entity 902A for the first company 950A (sole owners of the application platform entity 902A). Managers are assigned for each model entity hierarchically below the application platform entity 902A. In the illustrated embodiment, a first manager 956A is assigned for model entity 906A1, and a second manger 956B is assigned for model entity 906A1.

Participant accounts are created. Since the owner of the project entity 902A would like the second company 950B and the third company 950C to be able to sign devices, but only allow users from the second company 950B to sign data for use in devices associated with the first project entity 904A1 (and not the second project entity 904A2), and only allow users from the third company 950C to sign data for use in devices associated with the second project entity 904A2 (and not the first project entity 904A1), two separate participant accounts are created, with each participant associated with a different project entity instead of creating a single participant account associated with the application platform entity 902A hierarchically above both project entity 904A1 and project entity 904A2. Referring to the embodiment illustrated in FIG. 9, a participant account 972B associated with project entity 904A1 is created for the second company 950B and a participant account 972C associated with project entity 904A2 is created for the third company 950C.

The first manger 956A then authorizes users 960B associated with the first participant account 972B and no other participant accounts (users associated with the owner account 970A may also be authorized) to sign the data to be installed on the devices of the device families associated with the configuration entities 908A1 an 908A2 hierarchically below the model entity 906A1 managed by the first manger 956A. Importantly, the first manager 956A is not enabled to authorize users 960C of the second participant account 972C to sign the data, because first manager 956A has not been designated by the first company 950A which has the owner account 970A as a manager of any of the model entities 906A2 hierarchically below project entity 904A2. Because the first manager 956A does not manage any of the model entities 906A2 hierarchically below project entity 904A2, the first manager 956A will not be presented with an interface that enables designation of users that include users 960C. Similarly, the second manager 956B authorizes users 960C associated with the second participant account 972C and no other participant accounts to sign the data to be installed on the devices associated with configuration entity 908A3. The second manager 956B is likewise not enabled to authorize users 960B of the second participant account 972B to sign the data, because second manger 956B has not been designated by the first company 950A which has the owner account 970A as a manager of any of the model entities 906A1 hierarchically below project entity 904A1. Because the second manager 956B does not manage any of the model entities 906A1 hierarchically below project entity 904A1, the second manager 956B will not be presented with an interface that enables designation of users that include users 960B.

As a result, first manager 956A has authorized users 960A (of the first company 950A) and users 960B (of the second company 950B) to sign data that is to be installed on devices of the model entity 706A1, including configuration entities 908A1 and 908A2. Further, second manager 956B has authorized users 960A (of the first company 950A) and users 960C (of third company 950C) to sign data that is to be installed on devices of the model entity 706A1, including configuration entity 908A3.

Figure 10:
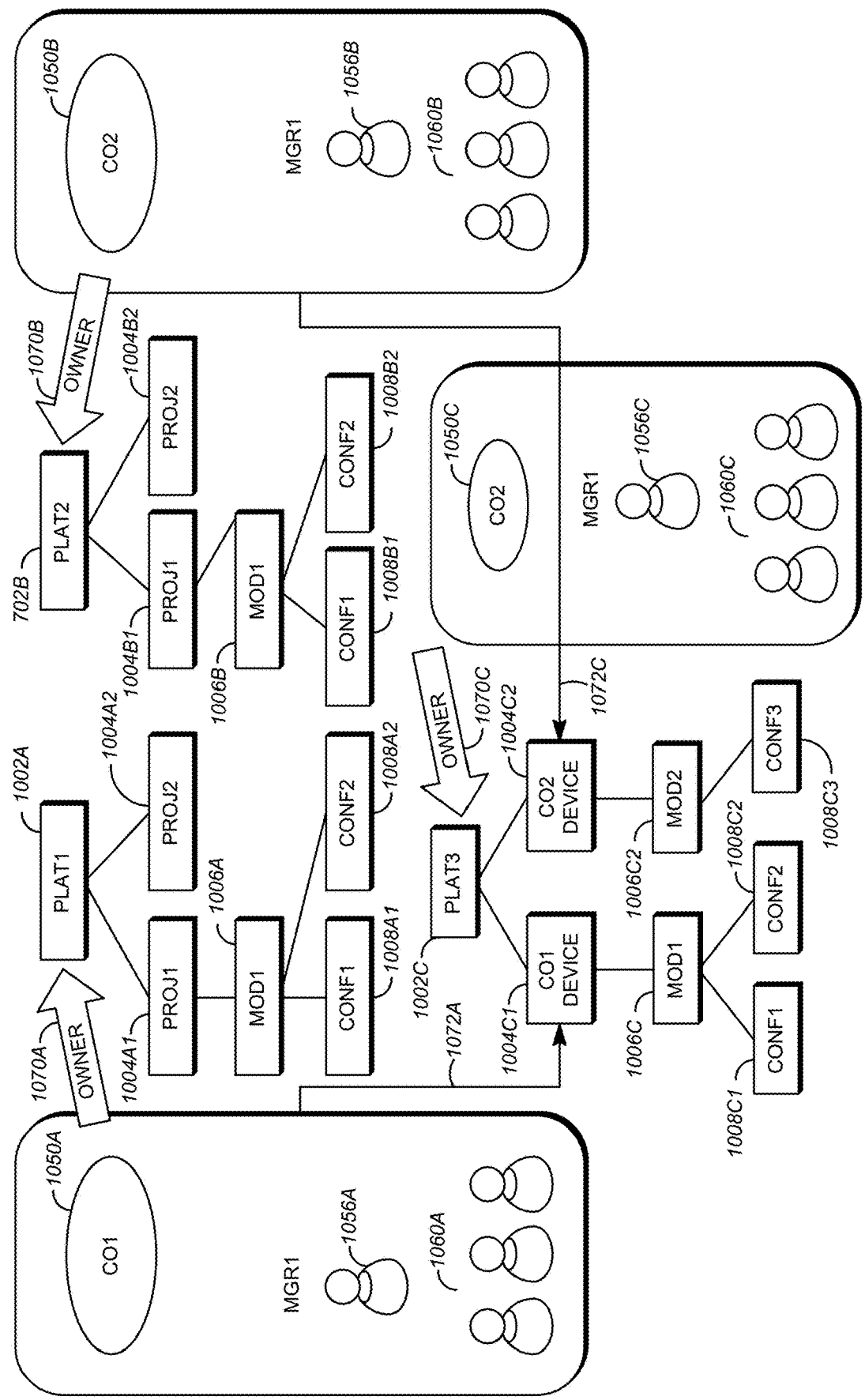

FIG. 10 is a diagram illustrating a fourth use application case of the OCSS 100. In this embodiment, a first company 1050A produces a first family of devices, and second company 1050B (independent from first company 1050A) produces a second family of devices. A third company 1050C (also independent from first company 1050A and second company 1050B) would like to source devices used to provide broadcast media services from first company 1050A and second company 1050B, and would like to allow the users of first company 1050 to sign data to be installed on the device family of the first company 1050A but not the second company 1050B, and would like the users of second company 1050B to be able to sign data to be installed on the device family of the second company 1050B, but not the first company 1050A.

To achieve these goals, the OCSS administrator defines a hierarchy of a plurality of entities. First company 1050A is defined the sole owner of application platform entity 1002A, and second company 1050B is defined the sole owner of application platform entity 1002B, and hierarchies of entities are defined below these application platform entities as described in FIG. 10. That is, two project entities 1004A1 and 1004A2 are defined to be hierarchically below platform entity 1002A, each representing a family of devices. Model entity 1006A is defined to be hierarchically below project entity 1004A1, and is the only such model entity hierarchically below project entity 1004A1. Model entity 1006A is also defined to be hierarchically above configuration entities 1008A1 and 1008A2. Hence, the hierarchy is defined such that platform entity 1002A is hierarchically above a first project entity 1004A1, which is hierarchically above a first model entity 1006A1, which is in turn hierarchically above the first configuration entity 1008A1 and second configuration entity 1008A2. The hierarchy may also be defined such that platform entity 1002A also includes a second project entity 1004A2, however, second project entity 1004A2 does not have any model entities or configuration entities.

Also in this embodiment, there are two project entities 1004B1 and 1004B2 hierarchically below platform entity 1002B, each representing a family of devices. Model entity 1006B is hierarchically below project entity 1004B1, and is the only such model entity hierarchically below project entity 1004B1. Model entity 1006B includes configuration entity 1008B1 and 1008B2. Hence, the platform entity 1002B includes a first project entity 1004B1, which includes a first model entity 1006B1, which includes a first configuration entity 1008B1 and second configuration entity 1008B2. Platform entity 1002B also includes a second project entity 1004B2, however, second project entity 1004B2 does not have any model entities or configuration entities.

This embodiment also includes a third company 1050C that would like for devices from first company 1050A and second company 1050B to be used with their application platform 1002C, but would like the control the authorization of users to sign data to be installed on those devices, even though the devices are produced by first company 1050A and second company 1050B, and not third company 1050C.

To accomplish this, the OCSS administrator defines application platform entity 1002C, with third company 1050C as the sole owner. Further, a first project entity 1004C1 and a second project entity 1004C2 are defined to be hierarchically below the third company's application platform entity 1002C, with the first project entity 1004C1 associated with the family of devices from the first company 1050A. A model entity 1006C1 is defined to be hierarchically below platform entity 1004C1, and hierarchically above configuration entities 1008C1 and 1008C2. Another model entity 1006C2 is defined to be hierarchically below platform entity 1004C1, and hierarchically above configuration entities 1008C3.

To implement the foregoing eligibilities and permissions, the OCSS administrator creates an owner account 1070C associated with the application platform entity 1002C for the third company 1050C (sole owners of the application platform entity 1050C). By assigning an owner account to the third company 1050C, the third company 1050C is eligible to enable its users 1060C to access any of the hierarchical entities below the application platform entity 1002C, including project entities 1004C1 (for the device family sourced by the first company 1050A) and 1004C2 (for the device family sourced by the second company 1050B). At least one manager 1056C is then assigned for at least the model entities 1006C1 and 1006C2 hierarchically below the project entities 1004C1 and 1004C2 are assigned for each model entity hierarchically below the application platform entity 1002C. In the illustrated embodiment, a first manager 1056C is assigned for model entity 1006C and model entity 1004C2. The assigned manager 1056C is then eligible to authorize users 1060C of the third company 1050C to sign the data to be installed on the devices associated with the configuration entities 1008C1 and 1008C2 hierarchically below model entity 1006C1 (and project entity 1004C1) as well as any devices below model entity 1006C2 (and project entity 1004C2).

Since third company 1050C would like to allow users 1060A from the first company 1050A to sign data to be installed on devices of the device family associated with project entity 1004C1 and to allow users 1060B to sign data to be installed on devices of the device family associated with project entity 1004C2, the OCSS administrator also creates participation accounts 1072A and 1072B associated with project entities 1004C1 and 1004C2, respectively. Participation account 1072A is granted to the first company 1050A and participation account 1072C is granted to the second company 1050B.

Manager 1056C is the manager of the model entities of interest (model entity 1006C1 and model entity 1006C2), and manager 1056C authorizes users 1060A associated with the first company 1050A to sign data that is to be installed on devices in the device family associated with model entity 1006C1 below project entity 1004C1. Manager 1056C also authorizes users 1060B associated with the second company 1050B to sign data that is to be installed on devices in the device family associated with model entity 1006C2 below project entity 1004C2.

Of course, since the OCSS administrator has granted the first company 1050A an owner account for application platform 1002A, a manager 1056A may be assigned to model entity 1006A, granting eligibility of the manager 1056A to allow users 1060A of the first company 1050A to sign data to be installed on devices in the family of devices associated with project entity 1004A1. But since second company 1050B and third company 1050C have not been granted participant accounts associated with application platform entity 1002A or project entity 1004A1, manager 1056A is not eligible to grant users 1060B and 1060C from second company 1050B and third company 1050C respectively permission to sign data that is to be installed on devices of the family of devices associated with project entity 1004A1. Similarly, since the OCSS administrator has granted the second company 1050B an owner account for application platform 1002B, a manager 1056B may be assigned to model entity 1006B, granting eligibility of the manager 1056B to allow users 1060B of the second company 1050B to sign data to be installed on devices in the family of devices associated with project entity 1004B1. But since first company 1050A and third company 1050C have not been granted participant accounts associated with application platform entity 1002B or project entity 1004B1, manager 1056B is not eligible to grant users 1060A and 1060C from first company 1050A and third company 1050C respectively permission to sign data that is to be installed on devices of the family of devices associated with project entity 1004A1.

As a result, manager 1056C may authorize users 1060A (of the first company 1050A) to sign data that is to be installed on devices of the model entity 1006C1, including configuration entities 1008C1 and 1008C2, and users 1060B (of the second company 1050B) to sign data that is to be installed on devices of the model entity 1006C2, including configuration entities 1008C3.

Based on the above description for FIGS. 7-10, the OCSS 100 provides flexibility for a company to define and to participate in various code signing service structures according to different access control needs and business requirements/agreements with other companies.

Implementation Options

As described above, the OCSS 100 may be implemented in embodiments wherein processing operations are allocated between an OCSS frontend 102 and an OCSS backend 104 communicatively coupled to the OCSS frontend 102. In such embodiments, the OCSS frontend 102 controls access to the OCSS backend 104, and the OCSS backend 104 is used to define hierarchies of entities and to manage the eligibility to designate users to access the entities described above.

In such embodiments, the OCSS backend 104 may be used to enforce sole eligibility to authorize access to the application platform entities, eligibility to permit authorization of access to any of the plurality of entities hierarchically below each of the application platform entities, eligibility to authorize users associated with the owner account to access to access the configuration entities hierarchically below the application platform entities to sign the data to be installed on the devices associated with the configuration entities, and to authorize users associated with participant accounts to access the configuration entities hierarchically below the entity to which the participation account is granted. The OCSS backend 104 also performs the cryptographic operations needed to sign the data to be installed on the devices.

The OCSS frontend 102 executes a presentation layer to present user interfaces that allow the OCSS administrator to define hierarchies of entities and to manage eligibility for data signing using owner and participant accounts, and also controls access to the OCSS backend 104. The presentation layer may provide an account setup page, a user registration page, an access request page, and a system access form page. The access request page shows the OCSS 100 hierarchy in the form of a tree down to the model entity level for users from company having the owner account to request additional permissions. The system access form allows users associated with the OCSS administrator's organization to request access to the OCSS 100. The presentation layer may also present a user interface for adding new users, as permitted only by OCSS administrators, a user interface for managing user permissions (using email addresses or other identifiers to find users and their associated account to verify eligibility for those users to access certain hierarchical entities), and for managing configuration permissions, and a configuration user interface that allows OCSS administrators to set up and update application platform, project, model and configuration entities, assign owners of those entities, and to define the hierarchy of those entities.

Code Signing System Elements

Figure 11:
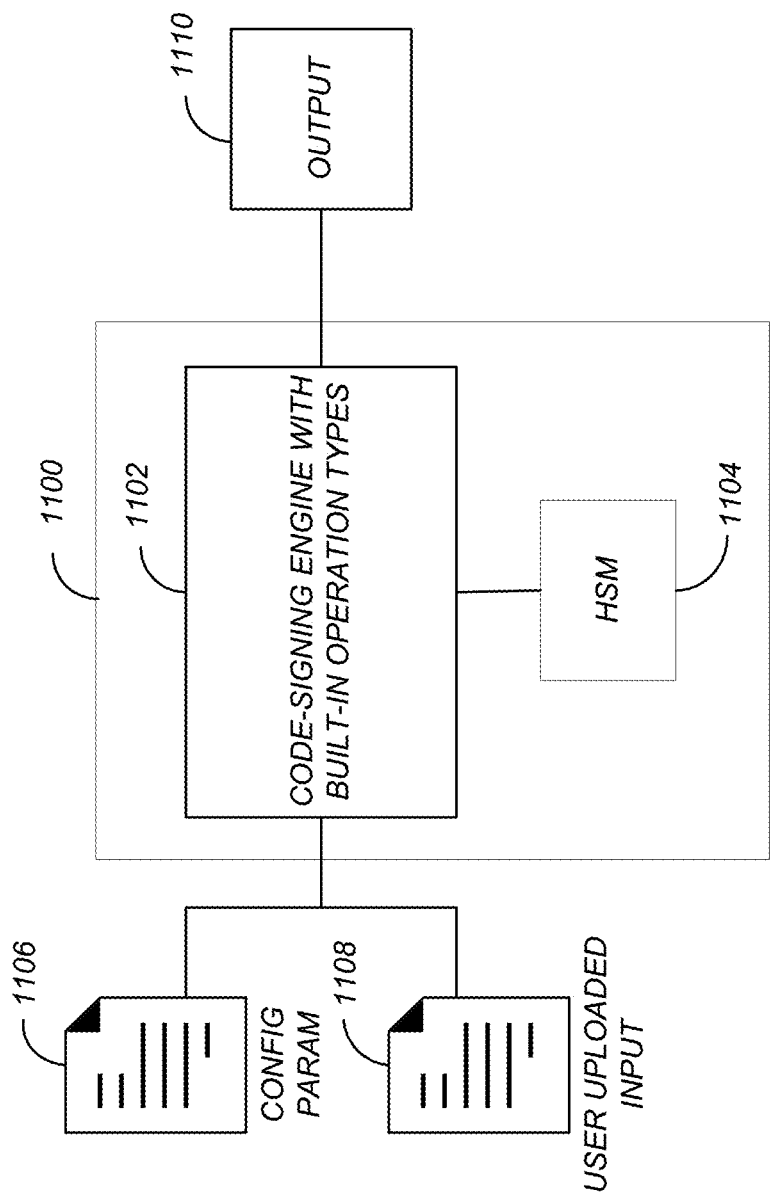
FIG. 11 is a diagram of elements of a general purpose machine-to-machine code signing system.

FIG. 11 is a diagram of elements of a general purpose machine-to-machine code signing system 1100. The system 1100 comprises a code signing engine 1102. In one embodiment, the code signing engine 1102 has built in code signing operations implemented as "operation types." Operation types may include for example, PKCS #1, PKCS #7, or any other standard or proprietary crypto operations. The system 1100 may also include an HSM 1104. Any cryptographic keys for signing and encryption are preferably protected in the HSM 1104 accessible by the Code Signing Engine 1102 via an API.

Before a client can use the code signing system 1000, a "configuration" is defined (typically by a system admin described above). The configuration defines the operation type, the key, and any standard parameters defined by the operation type. For example, the PKCS #1 operation type may require am RSA signing key, and standard parameters may include the Endianess of the operation and what hashing algorithm to use (for example, SHA1 or SHA256).

Once the configuration is defined and authorized to a client, the client can sign code by submitting a request with a pointer to the configuration and the input code image to the system. The code signing engine 1002 executes the code implemented for that operation type over the configuration parameters and input image in the request, to create the final output image to return to the client.

There are different ways to organize signing configurations. One such way is to use a hierarchy structure such as the one illustrated in FIG. 5, discussed above. The configurations are organized in a hierarchy structure starting from Platform 402, followed by project 404, model 406 and then the actual configurations 408. Users of the code signing system may be assigned different roles. In this example, the Administrator 502 is responsible for defining the various entities in the system and assigning users 508 as manager 506 to models 406. The managers 506 are responsible for assigning users 508 (machine clients in this case) to the actual signing configurations. And finally, machine client 508 can submit signing requests to authorized configurations to perform signing operations.

Figure 12:
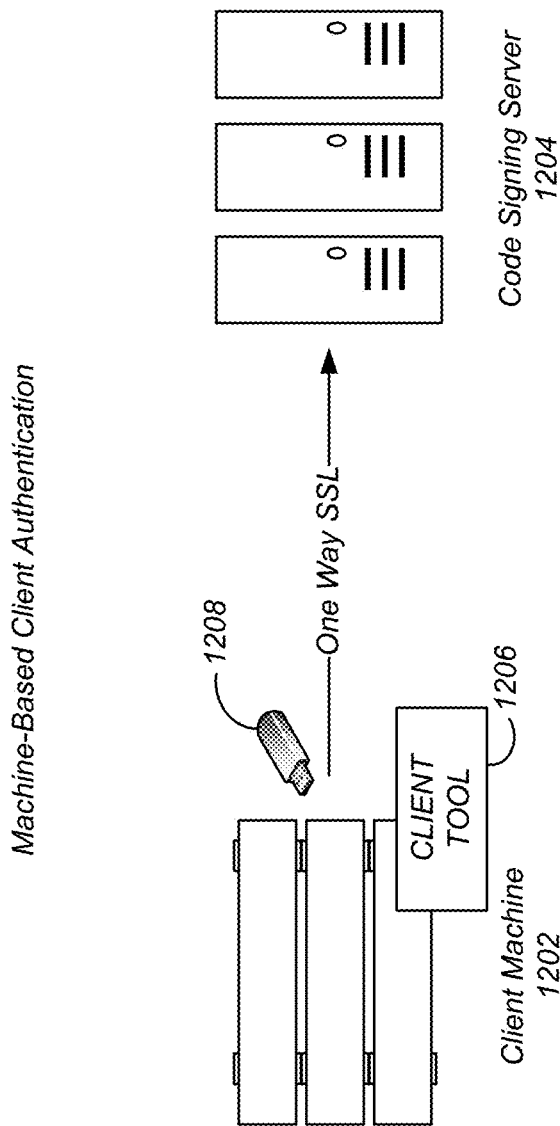
FIG. 12 is a diagram illustrating the use of a client tool and a code signing system for use in signing software images and other data.

FIG. 12 is a diagram illustrating the use of a client tool 1206 and a code signing system 1204 for use in signing software images and other data. The client tool 1206 is implemented to execute on a client machine 1202 which communicates with a code signing system 1204 (CSS) over a communication channel. The communication between the client machine 1202 and the code signing system (CSS) 1204 may be implemented with secure socket layer (SSL) communications for security. Mutual authentication may be achieved wherein the client machine 1202 authenticates the CSS 1204 based on the server's certificate, and the client machine 1202 is authenticated to the CSS 1204 via message signature generated using a unique private key and certificate loaded a USB Crypto Token 1208 previously issued for use with the client machine 1202. Alternatively, a two-way SSL connection can be set up where in both sides use their certificates to authenticate the SSL handshake.

The client tool 1206 is capable of submitting code signing request to the CSS 1204, providing information comprising a pointer to the code signing configuration (stored at the CSS 1204), input image, and any optional parameters required for the operation to be performed. The interface to the CSS 1204 may be implemented using any protocols, one common choice is the SOAP (Simple Object Access Protocol), which is an XML based protocol over HTTPS. The message is signed by the unique private key in the USB Crypto Token 1208. The CSS 1204 verifies the message signature to make sure it is authenticated. The CSS 1204 then verifies that the client machine 1202 machine (identified by the token's certificate) is authorized for the requested signing configuration. If so, the CSS 1204 processes the code signing request and return the result to the client machine 1202.

As described above, there are typically some processing steps to be performed before and after the signature is generated by the CSS 1204. These processing steps may be implemented on the CSS 1204 side, in which case the full software image must be uploaded to the CSS 1204 for processing. When the software image size is large, this process is time consuming and the transmission may be interrupted if the communication link is unreliable.

Generic Code Signing Client with Downloadable Modules

Previously, code signing operations were performed by non-generic clients and hence, new or updated client software had to be installed on each client machine 1202 as it was released. This is time consuming and can be inconvenient for users operating the client machines 1202. The approach described below uses modules executable by a generic client to transmit hashes of the software images rather than the images themselves for CSS1204 to sign, and thus avoids both the requirement for new or updated client software (e.g. non-generic client to implement each operation type specific pre-processing and/or post processing logic) and the uploading of full software images to the CSS 1204 to have all the pre-processing and post-processing done on the CSS 1204. This approach uses a generic client 1302 that requests and downloads processing modules from the CSS 1204 to perform the pre-processing operations in signing software images, and optionally, post-processing operations as well. The client is generic in that the client can perform this functionality using the functionality present in standard generic processors, and does not need to be executing updated client software to perform this function.

Accordingly, the client can be kept generic, and any new operations supported will be transparent to the clients and users. Further, since processing steps may also be implemented on the client side, so that only a hash of the to-be-signed data is submitted to the server for signing. This eliminates the problem of having to upload a large file to the server. However, each time a new operation type needs to be supported, a new downloadable module has to be implemented and released.

Figure 13:
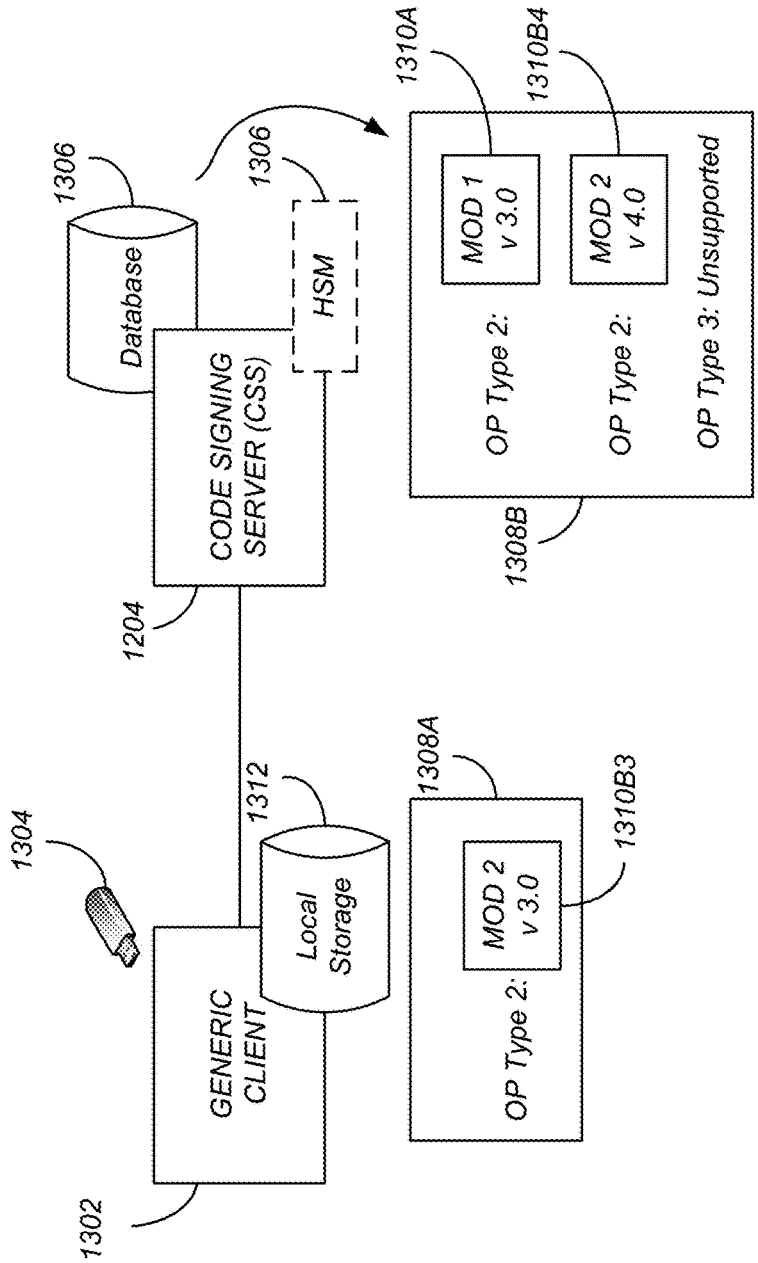
FIG. 13 is a diagram illustrating elements of the generic code signing system.

FIG. 13 is a diagram illustrating elements of the generic code signing system (GCSS) 1300. The GCSS 1300 comprises a generic client 1302 (alternatively referred to hereinafter as simply "client") and a code signing system 1204. In addition to the features described above, the CSS 1204 maintains a database 1306 having a list 1308B of modules including, for example, version 3.0 of module 1 1310A and version 4 of module 2 1310B4. The CSS 1204 also maintains a mapping between operation types and each downloadable module 1310 (hereinafter alternatively referred to simply as module(s)). For each module, a version number is also maintained, to make sure that a client uses the latest version implemented. Some operation types may not be supported, and are marked as such in the database.

The client 1302 supports the downloading and use of the modules 1310. The client 1302 makes use of a USB crypto token 1304 for client 1302 authentication to the user in the same way described above for the basic machine-to-machine setup. The client 1302 maintains a local list 1308A mapping operation type to the appropriate module 1310 for performing that operation type. The client 1302 also locally stores modules 1310 for future use. When client 1302 is first provisioned to a new client machine 1302, the list 1308A may be empty, but the list 1308A is augmented to reflect new modules and their related operation type as the new modules are received in response to signing requests transmitted to the CSS 1204.

To support the downloading and execution of the modules 1310, the client 1302 has a built-in software module that performs the verification, interpretation and invocation of modules 1310. The client 1302 also supports certain basic cryptographic operations such as hashing.

Figure 14A:
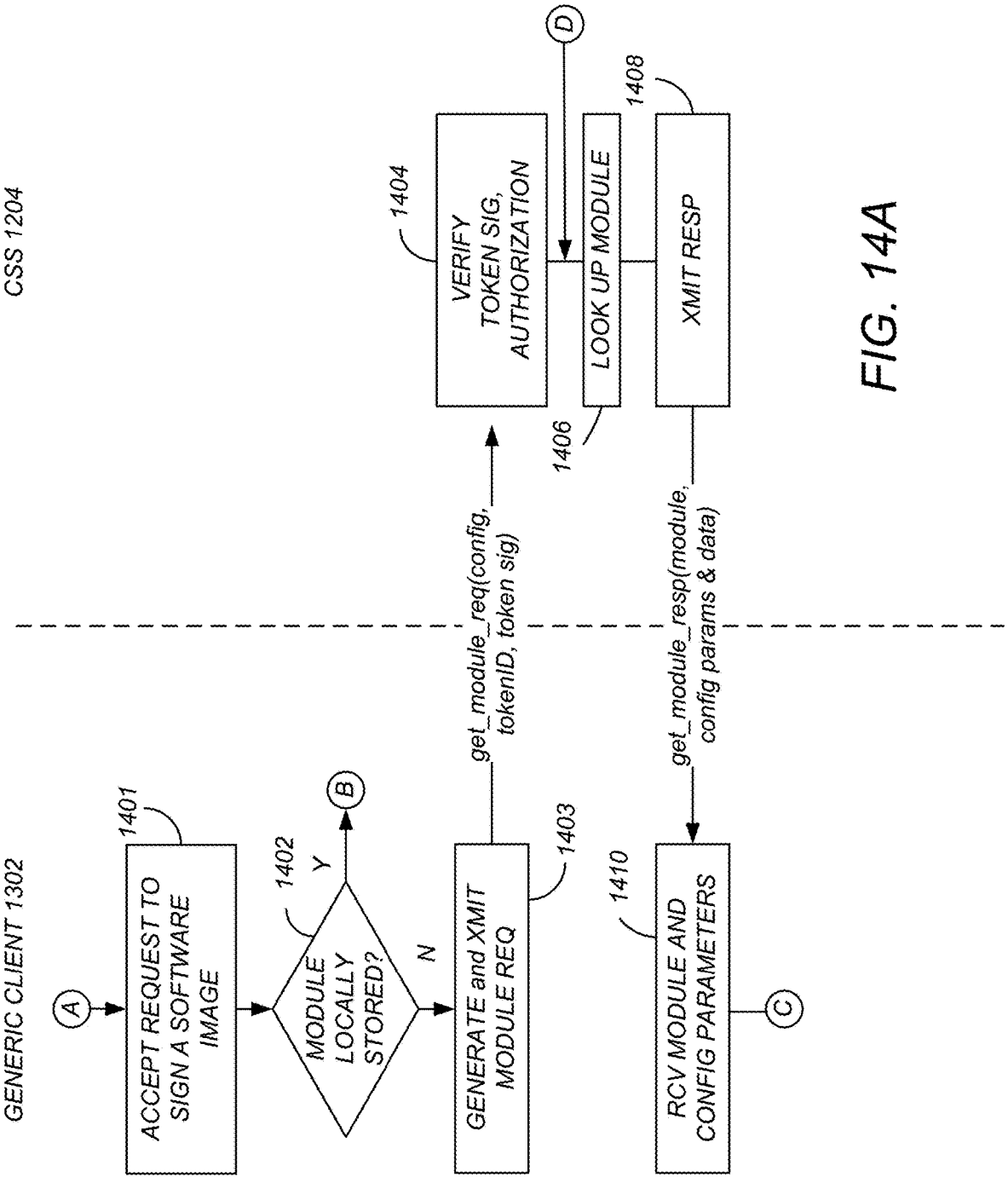
FIGS. 14A-14C are diagrams presenting a flow chart of exemplary operations that can be used to sign a software image using a generic client.
Figure 14B:
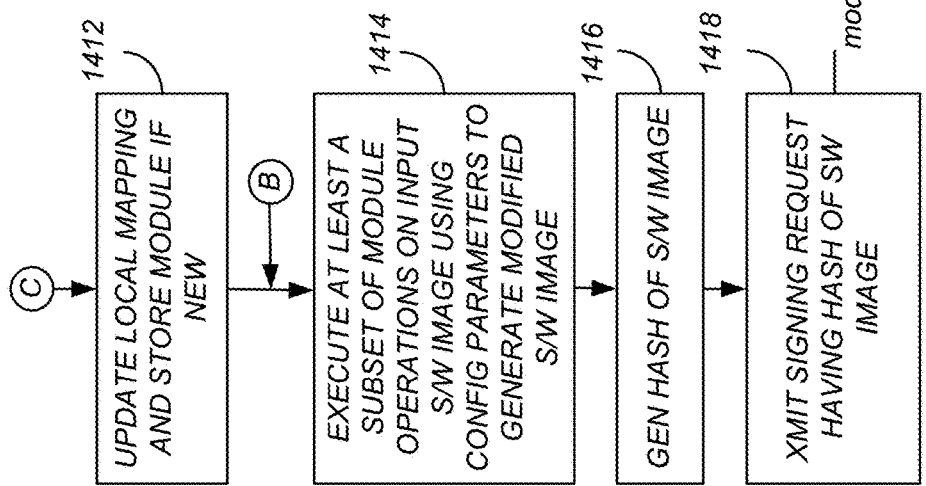
Figure 14C:
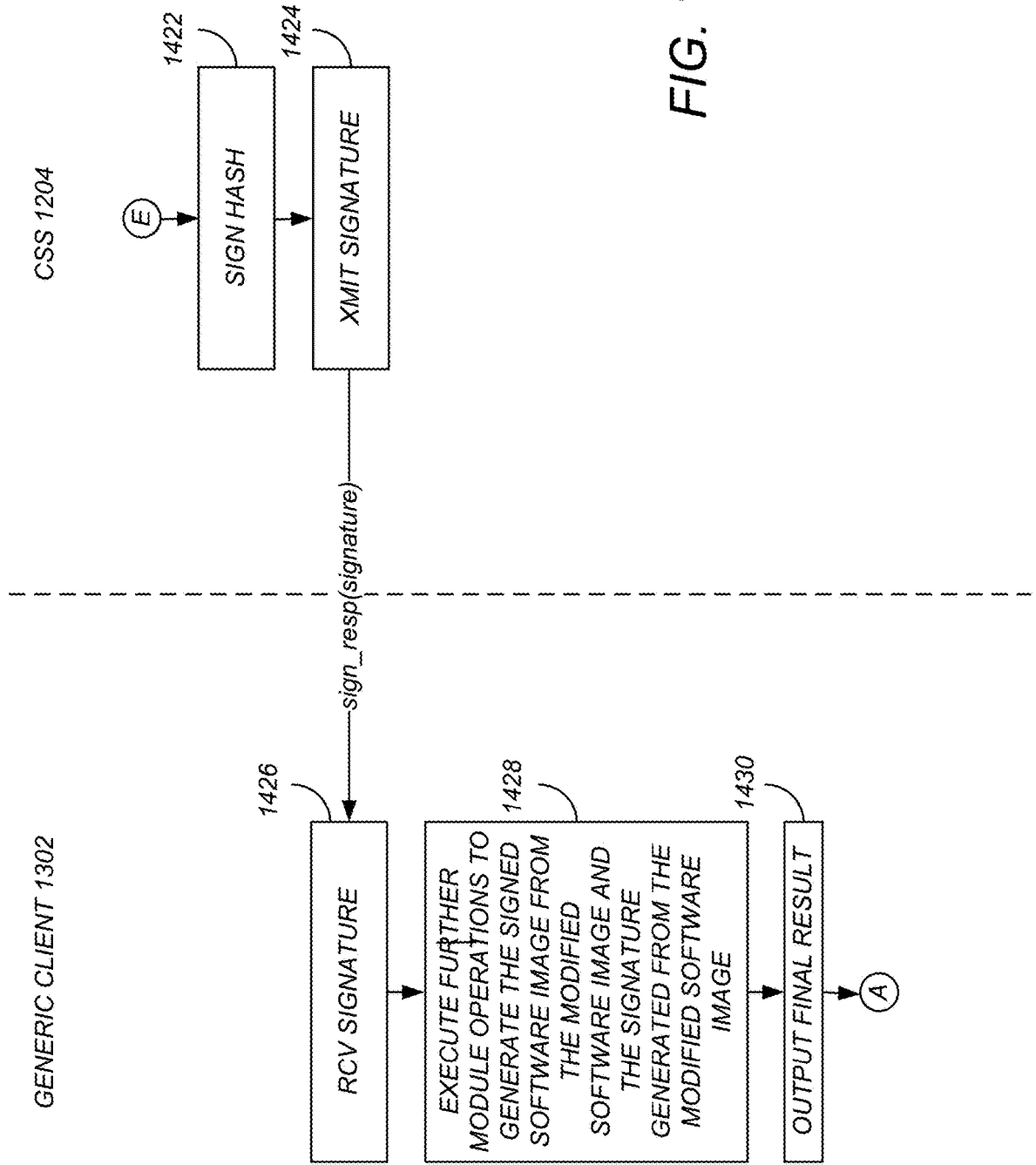

FIGS. 14A-14C are diagrams presenting a flow chart of exemplary operations that can be used to sign a software image using a client 1302. A request to sign a software image is accepted in the client 1302, as shown in block 1401. The request comprises the software image and a pointer to a selected signing configuration, which signing convention includes an operation type. The request can be generated by a user of the client 1302 or a script invoking the client 1302 to perform a code signing operation. This script may be stored on local storage 1312. Hence, the input to the client invocation includes a pointer to a desired signing configuration (config), the input software image, and other parameters required by the signing configuration. In block 1402, the client 1302 determines if a module needed to perform the signing of the software image according to the desired configuration is disposed in local storage 1312 (e.g. locally stored). If not, processing proceeds to block 1403.

In block 1403, the client 1302 generates a module request (the illustrated "get_module_req") to obtain the most recent version of the module 1310 having operations associated with signing the software image, and transmits this request to the CSS 1204. The request comprises the pointer to the desired signing configuration. In one embodiment the request message is signed by the USB crypto token 1304 and includes an identifier of the token (token ID). An example embodiment of a message having the module request is shown below:

get_module_req(config, token ID, token sig)

where:

config: pointer to the signing configuration being requested;

token ID: a unique identifier assigned to the USB Crypto Token 1304;

token sig:—The signature of the request signed using the USB Crypto Token.

Upon receiving the module request, the CSS 1204 uses the token signature to verify the message signature to ensure that it is coming from a valid client 1302 corresponding to a valid USB Crypto Token 1304. The CSS 1204 then verifies that the token 1304 identified by the token ID is authorized for the configuration associated with the pointer in the get_module_req message. This is illustrated in block 1404. If the message signature cannot be verified or the token is not authorized, a message is transmitted to the client 1302 indicating the failure, and no further processing occurs in the CSS 1204. If the message signature is verified and the token 1304 is authorized, the CSS 1204 uses the pointer received in the module request message to look up the configuration parameters (including the operation type) associated with the pointer. The CSS 1204 searches the database 1306 to identify a module 1310 that performs the requested operation type identified by the pointer, as shown in block 1406. If the CSS 1204 finds a module 1310 that supports the operation type, the CSS 1204 retrieves that module 1310. The CSS then creates a response message to the client 1302. The response message comprises the module 1310 identified in block 1406 and at least a subset of the config parameters and data required by the client 1302 to process the module 1310 and perform the module operations. An exemplary response message is illustrated below:

get_module_resp(Module, config params & data)

where:

Module: the downloadable module 1310 associated with the operation type of the requested configuration identified by the pointer;

config params & data: Configuration parameters and data associated with the configuration that the client needed by the client 1302 to perform client-side processing to execute the module 1310.

In block 1410, the client 1302 receives the response message having the identified module 1310 and the configuration parameters. After receiving the message, the client 1302 maps the requested operation type to the module 1310 received from the CSS 1204 and updates its local storage 1312 to include this mapping. The client 1302 also checks to see if the received module 1310 is a newer version of the module than a previously stored module for the requested operation type (if any). If the received module 1310 is newer than the stored version for the same operational type, the client 1302 stores the received module 1310 to its local storage 1312 for later use. This permits the received module 1310 to be used for future requests for the same operation type as further described below.

The client 1302 then invokes the module 1310 to execute at least a subset of the module 1310 operations on the input software image using the received configuration parameters to generate a modified (also referred to hereinafter as a "to be signed") software image, as shown in block 1414. The resulting modified image is stored in storage 1312 local to the client 1302.

In one embodiment, the software image transmitted from the client 1302 to the CSS 1204 includes a secure version number, and the CSS 1204 returns the same secure version number among the configuration parameters in the response message. In this embodiment, the module 1310 may include a sub-routine (e.g. a subset of operations) that perform a check to assure that the secure version of the transmitted software image is the same as the secure version number defined by the configuration parameters received from the CSS 1204.

In another embodiment, the configuration parameters received from the CSS 1204 may include a key identifier (key ID value) that must be inserted into the software image as at least a part of the operations performed by the module to create the modified (to be signed) software image.

In still another embodiment, configuration parameters received from the CSS 1204 may include a code-signing digital certificate that must be inserted into the software image as at least a part of the operations performed by the module to create the modified (to be signed) software image.

A hash of the to-be-signed (or modified) software image is then generated, as shown in block 1416. The client 1302 then generates a signing request that is transmitted to the CSS 1204, as shown in block 1418. The signing request includes the hash of the modified version of the software image, as well as other information. In the illustrated embodiment, the hash includes a the pointer to the configuration, the modified software image, and an identifier of the version of the module 1310 used to generate the modified software image. In one embodiment, the message is again signed by the crypto-token 1304 before transmission for security purposes, for later verification by the CSS 1204. An exemplary signing request is shown below:

sign_req(config, tbs_data, Module version, token ID, token sig)

where:

config—pointer to the Signing Configuration being requested;

tbs_data—The hash of the modified software image, or to-be-signed data;

Module version—the version of the downloadable module 1310 used by the client 1302 to generate this request;

token ID—a unique identifier assigned to the USB Crypto Token 1304;

token sig—The signature of the request signed using the USB Crypto Token 1304.

The CSS 1204 receives the signing request. The CSS 1204 performs a verification of the message signature, and determines if the token identified by the token ID received in the signing request using the same technique described in block 1404 above. The CSS 1204 may also use the module version information in the request message to verify that the client 1302 used the latest version of the module 1310 to generate the modified software image, as shown in block 1420. If the module version is not the latest, the CSS 1204 may simply reject the request, or may route processing to block 1406 to look up the latest module version needed and transmit that version to the client 1302 as shown in block 1408 (hence, responding with a module response message having the latest version of the required module). The CSS 1204 may also check and determine if the module is not intended for use with the operation type defined in the configuration parameters associated with the pointer, and only proceed if the module was intended for such use.

If these tests are passed, the CSS 1204 signs the hash of the modified software image, as shown in block 1422. The CSS 1204 then generates a response message having the signed hash of the modified software image, and transmits response message including the signed hash of the modified software image to the client 1302, as shown in blocks 1424. An exemplary response message is presented below:

sign_resp(signature)

where:

signature—Hash of the modified software image signed by the CSS 1204.

In block 1426, the client 1302 receives the response message, and in block 1426, the client again invokes the module 1310 to execute further module operations to generate the signed software image from the modified software image and the signed hash of the modified software image. The module 1310 may also optionally use the configuration parameters and data received in the get module response received in block 1410 to generate the signed software image. Finally, in block 1430, the client 1302 outputs the resulting signed software image.

If a user of the client 1302 wishes to sign another software image according to a signing configuration having the same operation type, processing begins again at block 1401. However, in block 1402, the client 1302 may determine that the module necessary to sign the software image is already in local storage 1312, as shown in block 1402. In this case, processing is routed to block 1414 and the client 1302 executes the software image (using the stored configuration parameters that were transmitted with the stored module 1310) to generate the modified software image. After generating a hash of the modified software image and sending that hash to the CSS 1204 in the signing request (as shown in block 1418), the CSS 1204 determines if that module used to generate the modified software image was, in fact, the newest version of the module using the module version identifier or other information transmitted in block 1418 (the client 1302 may not be aware that a new version of the module is available). If the CSS 1204 determines that the newest version of the module was not used to generate the modified software image, processing is routed to block 1406, and the updated version of the module is obtained for use and transmitted to the client 1302, and processing proceeds as before with the updated version of the module 1310. Alternatively, the CSS 1204 may simply reject the request from the client 1302, causing the client to route processing to block 1403 to generate a new module request. If the newest version of the module 1310 was used to generate the modified software image, processing is simply routed to block 1422, and processing proceeds normally.

Multi-Step Cases

FIGS. 14A-14B illustrate a simple case wherein the signing of the software image is accomplished by a pre-processing step to generate the modified software image, a signing request transmitted from the client 1302 to the CSS 1204 to sign a client generated hash of the modified software image, then a post processing step performed by the client 1302 to execute further module 1310 operations to generate a signed software image. However, the foregoing principles can be used to perform a software signing process having any number of processing steps shared between the client 1302 and the CSS 1204. For example, the client 1302 may use the module 1310 to perform the any plurality of N steps, for example:

Client 1302 performs processing step 1

Client 1302 sends first signing request to CSS 1204

Client 1302 receives signing response from CSS 1204

Client 1302 performs processing step 2
Client 1302 sends second signing request to CSS 1204
Client 1302 receives signing response from CSS 1204
. . .
Client 1302 performs processing step N-1
Client 1302 sends Nth signing request to CSS 1204
Client 1302 receives Nth signing response from CSS 1204
Client 1302 performs final processing step N to generate software image This process can be performed in a pre-defined way for a given operation type. This can happen, for example, if there are signatures over signatures. For example, each signing request may generate a further modified version of the software image or may request the signing of a different parameter than the other signing requests.

In cases where a plurality of N steps are desired, the CSS 1204 may specify which step within the operation type the client 1302 is being requested to perform in the response message. In this case, the client 1302 may indicate which step was performed in the signing request.

Software Image Encryption Support

The foregoing describes technique that allows a software image to be signed without uploading the software image to the CSS 1204. If it is desired to encrypt the software image, it becomes necessary to either (1) upload the software image to the CSS 1204 or (2) push the encryption key needed to encrypt the software image to the client 1302, and allow the encryption to be performed by the client 1302. If it is permitted to push the encryption key to the client 1302, the encryption key may be a random key generated in response to an encryption request, and the random key may be protected by a global key at the CSS. The code encryption key may then be passed to the client 1302 in the get module response message, for example, as a configuration parameter. The code encryption key may then be unwrapped (e.g. decrypted within the crypto token 1304) for use rather than being decrypted to the local storage 1312 of the client 1302. Once unwrapped, the code encryption key can be used by the module operations executing on the client 1302 to encrypt at least a portion of the software image as desired. After such encryption, the encryption key can be removed to prevent compromise. In this way, encryption of the software image can be implemented without requiring the image to be sent to the CSS 1204.

Module Authenticity and Integrity

To ensure the authenticity and integrity of the modules 1310 obtained from the CSS 1204, each module can be individually signed using a key (for example, denoted as a module signing key) belonging to the CSS 1204. The client 1302 can be provisioned with an embedded verification key corresponding to the server's Module Signing Key. When a new Module is downloaded from the Server, the client shall verify the signature of the module 1310 to make sure it is authentic before storing or using the module 1310.

Downloadable Module Embodiments

The modules 1310 can take different forms. In one embodiment, the modules 1310 each comprise software instructions describing executable code appropriate for the operating system of the client 1302. In another embodiment in which the client 1302 supports a plurality of atomic operations, the modules 1310 may not include executable code, but rather, "workflows" or "recipes" that would indicate to the client 1302 which atomic operations should be performed and in what sequence. Hence, the module 1310 may be in binary form, or alternatively, human readable XML form. In this embodiment, the module 1310 provides essentially a mapping to the identity and order of the atomic operations to be performed.

Furthermore, the atomic operations may be downloadable themselves instead of being pre-provisioned to the client 1302. For example, an atomic operation may be implemented for SHA3 hashing algorithm. When this atomic operation is downloaded to the client 1302, the client 1302 can use it to perform SHA3 hashing algorithm locally.

Client Implementations

The client 1302 may be implemented using JAVA. In this implementation the modules 1310 may be implemented as JAVA class files, and the JAVA API to obtain the module 1310 may be expressed as:
  Module get_module_req(string config, int token_ID, byte[ ] token_sig);
The API will return an instance of a Module class:

```
public class Module
{
    public byte[ ] module;
    public string config_params;
}
```

Figure 15:
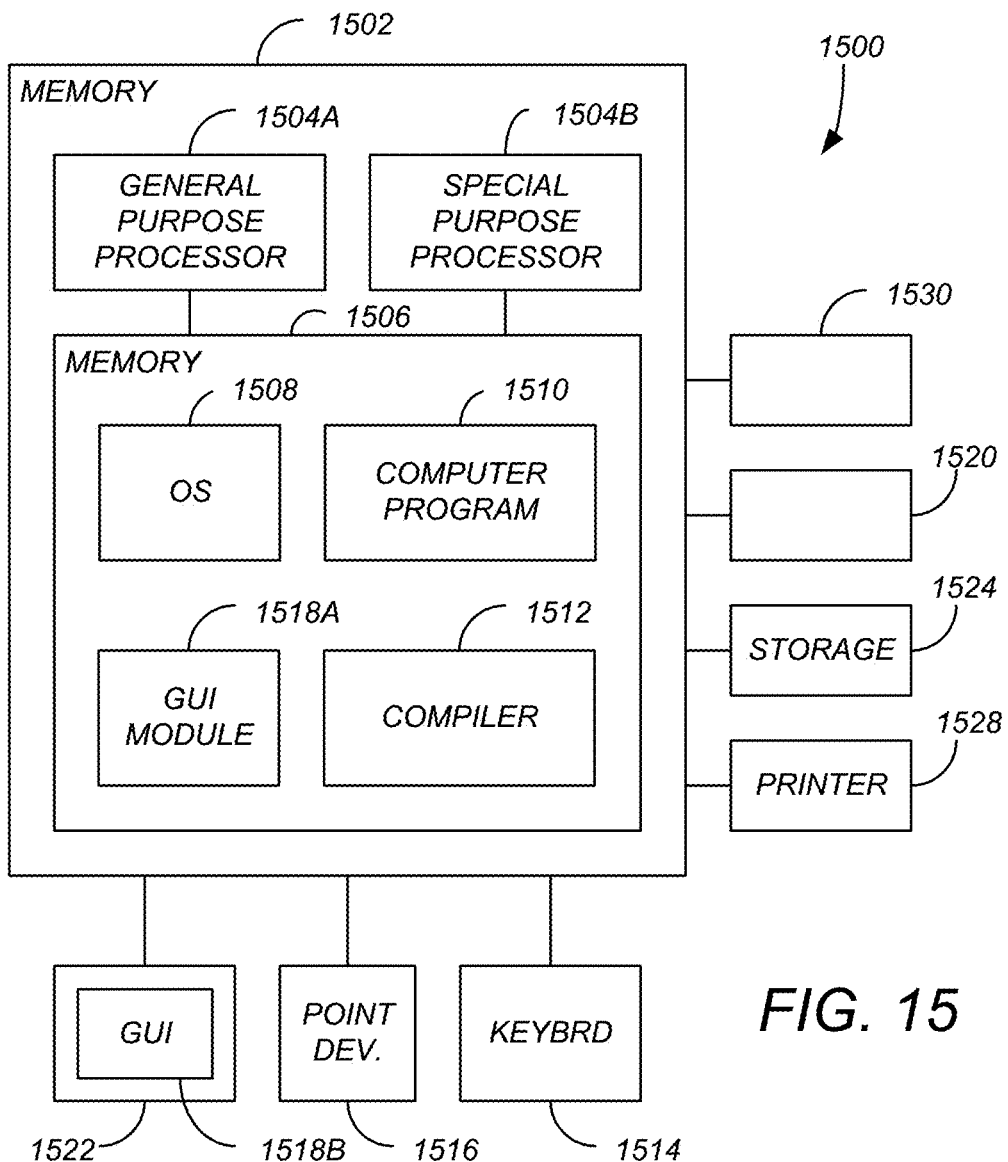
FIG. 15 is a diagram illustrating an exemplary computer system that could be used to implement elements of the system.

Further, an API for a JAVA client 1302 to obtain the signature after using the module 1310 to construct the modified software image or "to be signed" data (tbs_data).
  byte[ ] sign_req(string config, byte[ ] tbs_data, int module_version, int token_ID, byte[ ] token_sig);
And the API from the CSS 1204 will return:
byte[ ] signature Hardware Environment FIG. 15 is a diagram illustrating an exemplary computer system 1500 that could be used to implement elements of the present invention, including the OCSS frontend 102, OCSS backend 104, firewalls 150 and 152, HSM 156, database 154, LDAP server 120, user computer 108, client machine 1202, code signing system 1204 generic client 1302 or any of the hardware tokens disclosed herein. The computer 1502 comprises a general purpose hardware processor 1504A and/or a special purpose hardware processor 1504B (hereinafter alternatively collectively referred to as processor 1504) and a memory 1506, such as random access memory (RAM). The computer 1502 may be coupled to other devices, including input/output (I/O) devices such as a keyboard 1514, a mouse device 1516 and a printer 1528.

In one embodiment, the computer 1502 operates by the general purpose processor 1504A performing instructions defined by the computer program 1510 under control of an operating system 1508. The computer program 1510 and/or the operating system 1508 may be stored in the memory 1506 and may interface with the user and/or other devices to accept input and commands and, based on such input and commands and the instructions defined by the computer program 1510 and operating system 1508 to provide output and results.

Output/results may be presented on the display 1522 or provided to another device for presentation or further processing or action. In one embodiment, the display 1522 comprises a liquid crystal display (LCD) having a plurality of separately addressable pixels formed by liquid crystals. Each pixel of the display 1522 changes to an opaque or translucent state to form a part of the image on the display in response to the data or information generated by the processor 1504 from the application of the instructions of the computer program 1510 and/or operating system 1508 to the input and commands. Other display 1522 types also include picture elements that change state in order to create the image presented on the display 1522. The image may be provided through a graphical user interface (GUI) module 1518A. Although the GUI module 1518A is depicted as a separate module, the instructions performing the GUI functions can be resident or distributed in the operating system 1508, the computer program 1510, or implemented with special purpose memory and processors.

Some or all of the operations performed by the computer 1502 according to the computer program 1510 instructions may be implemented in a special purpose processor 1504B. In this embodiment, some or all of the computer program 1510 instructions may be implemented via firmware instructions stored in a read only memory (ROM), a programmable read only memory (PROM) or flash memory within the special purpose processor 1504B or in memory 1506. The special purpose processor 1504B may also be hardwired through circuit design to perform some or all of the operations to implement the present invention. Further, the special purpose processor 1504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1502 may also implement a compiler 1512 which allows an application program 1510 written in a programming language such as COBOL, C++, FORTRAN, or other language to be translated into processor 1504 readable code. After completion, the application or computer program 1510 accesses and manipulates data accepted from I/O devices and stored in the memory 1506 of the computer 1502 using the relationships and logic that was generated using the compiler 1512.

The computer 1502 also optionally comprises an external communication device such as a modem, satellite link, Ethernet card, or other device for accepting input from and providing output to other computers.

In one embodiment, instructions implementing the operating system 1508, the computer program 1510, and/or the compiler 1512 are tangibly embodied in a computer-readable medium, e.g., data storage device 1520, which could include one or more fixed or removable data storage devices, such as a zip drive, floppy disc drive 1524, hard drive, CD-ROM drive, tape drive, or a flash drive. Further, the operating system 1508 and the computer program 1510 are comprised of computer program instructions which, when accessed, read and executed by the computer 1502, causes the computer 1502 to perform the steps necessary to implement and/or use the present invention or to load the program of instructions into a memory, thus creating a special purpose data structure causing the computer to operate as a specially programmed computer executing the method steps described herein. Computer program 1510 and/or operating instructions may also be tangibly embodied in memory 1506 and/or data communications devices 1530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1502.

Although the term "computer" is referred to herein, it is understood that the computer may include portable devices such as cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of signing a software image, at least a portion of the method being performed by a computer device comprising one or more processors, the method comprising:
   (a) accepting a request to sign a software image, the request comprising:
      the software image; and
      a pointer to a signing configuration already defined in a signing system, the signing configuration including a signing operation type;
   (b) transmitting a module request to the signing system, the module request for a module for performing operations associated with signing the software image, the request comprising the pointer to the signing configuration;
   (c) receiving the module and at least a subset of configuration parameters for executing the module from the signing system, the module identified by the signing system according to the pointer transmitted with the module request;
   (d) executing at least a subset of the operations of the received module on the software image according to the at least a subset of the configuration parameters to generate a modified software image;
   (e) generating a hash of the modified software image;
   (f) transmitting a signing request to the signing system, the signing request comprising the hash of the modified software image and a pointer to the configuration; and
   (g) receiving a signature generated from the modified software image that verifies the authenticity of the software image.

2. The method of claim 1, further comprising:
(h) executing further module operations to generate the signed software image according to the modified software image and the signature generated from the modified software image.

3. The method of claim 1, further comprising:
determining if the received module is a newer version of a locally stored received module and if no version of the received module is locally stored; and
if the received module is a newer version of the locally stored module, or if no version of the received module is locally stored:
generating a mapping of the received module to the signing operation type;
locally storing the mapping;
locally storing the received module as the locally stored module.

4. The method of claim 1, further comprising:
accepting a second request to sign a software image, the request comprising:
a second software image
a second pointer to the signing configuration already defined in the signing system, the signing configuration including the signing operation type;
determining if the module is locally stored; and
performing steps (d)-(g) using the locally stored module only if the module is locally stored;
performing steps (b)-(g) if the module is not locally stored.

5. The method of claim 4, wherein the module is locally stored, and wherein:
the signing request further comprises a version identifier of the executed module;
if the executed module is not the latest version of the module as determined by the signing system from the version identifier of the executed module:
receiving a newer version of the module and at least a subset of configuration parameters for executing the newer version of the module from the signing system;
executing at least a subset of the operations of the newer version of the module on the software image according to the at least a subset of the configuration parameters to generate a modified software image;
generating a second hash of the modified software image;
transmitting a second signing request to the signing system, the second signing request comprising the second hash of the modified software image and the second pointer to the signing configuration; and
receiving a signature generated from the modified software image.

6. The method of claim 1, wherein:
the module request is transmitted from a client having a crypto-token;
the module request further comprises:
a crypto-token identifier;
a crypto-token signature; and
before transmitting the received the module and configuration parameters, the signing system verifies the client according to the crypto token identifier and the crypto-token signature.

7. The method of claim 1, wherein:
the software image comprises a first version identifier;
the at least a subset of the configuration parameters comprises a second version identifier;
the method further comprises:
determining, by the executing module, whether the first version identifier equals the second version identifier; and
performing steps (f)-(g) according to the determination.

8. The method of claim 1, wherein:
the configuration parameters further comprise at least one key identifiers or more code signing digital certificate to be inserted into the modified software image.

9. The method of claim 1, wherein the module comprises executable code.

10. The method of claim 1, wherein the module comprises a binary mapping to atomic operations for performing at least the subset of the operations of the module.

11. The method of claim 10, wherein the atomic operations are pre-provisioned to a generic client performing steps (a)-(g).

12. The method of claim 1, wherein:
the received configuration parameters include a code encryption key;
the executed subset of operations includes decrypting the encrypted code encryption key; and
at least a portion of the modified software image is encrypted according to the code encryption key.

13. An apparatus for signing a software image, comprising:
a processor;
a memory, communicatively coupled to the processor, the memory storing processor instructions comprising instructions for:
(a) accepting a request to sign a software image, the request comprising:
the software image; and
a pointer to a signing configuration already defined in a signing system, the signing configuration including a signing operation type;
(b) transmitting a module request to the signing system, the module request for a module for performing operations associated with signing the software image, the request comprising the pointer to the signing configuration;
(c) receiving the module and at least a subset of configuration parameters for executing the module from the signing system, the module identified by the signing system according to the pointer transmitted with the module request;
(d) executing at least a subset of the operations of the received module on the software image according to the at least a subset of the configuration parameters to generate a modified software image;
(e) generating a hash of the modified software image;
(f) transmitting a signing request to the signing system, the signing request comprising the hash of the modified software image and a pointer to the configuration; and
(g) receiving a signature generated from the modified software image that verifies the authenticity of the software image.

14. The apparatus of claim 13, wherein the processor instructions further comprise instructions for:
(h) executing further module operations to generate the signed software image according to the modified software image and the signature generated from the modified software image.

15. The apparatus of claim 13, wherein the processor instructions further comprise instructions for:
determining if the received module is a newer version of a locally stored received module and if no version of the received module is locally stored; and if the received module is a newer version of the locally stored module, or if no version of the received module is locally stored:
    generating a mapping of the received module to the signing operation type;
    locally storing the mapping;
    locally storing the received module as the locally stored module.

16. The apparatus of claim 13, wherein the processor instructions further comprise instructions for:
    accepting a second request to sign a software image, the request comprising:
        a second software image;
        a second pointer to the signing configuration already defined in the signing system, the signing configuration including the signing operation type;
    determining if the module is locally stored; and
    performing steps (d)-(g) using the locally stored module only if the module is locally stored;
    performing steps (b)-(g) if the module is not locally stored.

17. The apparatus of claim 16, wherein the module is locally stored, and wherein:
    the signing request further comprises a version identifier of the executed module;
    the processor instructions further comprise processor instructions for:
        if the executed module is not the latest version of the module as determined by the signing system from the version identifier of the executed module:
            receiving a newer version of the module and at least a subset of configuration parameters for executing the newer version of the module from the signing system;
        executing at least a subset of the operations of the received newer version of the module on the software image according to the at least a subset of the configuration parameters to generate a modified software image;
    generating a second hash of the modified software image;
    transmitting a second signing request to the signing system, the second signing request comprising the second hash of the modified software image and the second pointer to the signing configuration; and
    receiving a signature generated from the modified software image.

18. The apparatus of claim 13, wherein:
    the module request is transmitted from a client having a crypto-token;
    the module request further comprises:
        a crypto-token identifier;
        a crypto-token signature; and
    before transmitting the received the module and configuration parameters, the signing system verifies the client according to the crypto token identifier and the crypto-token signature.

19. The apparatus of claim 13, wherein:
    the software image comprises a first version identifier;
    the at least a subset of the configuration parameters comprises a second version identifier;
    the processor instructions further comprise instructions for:
        determining, by the executing module, whether the first version identifier equals the second version identifier; and
    performing steps (f)-(g) according to the determination.

20. The apparatus of claim 13, wherein:
    the configuration parameters further comprise at least one key identifiers or more code signing digital certificate to be inserted into the modified software image.

* * * * *